US011008349B2

(12) United States Patent
Auner et al.

(10) Patent No.: US 11,008,349 B2
(45) Date of Patent: May 18, 2021

(54) PROCESS FOR THE PRODUCTION OF ORGANOHYDRIDOCHLOROSILANES

(71) Applicant: MOMENTIVE PERFORMANCE MATERIALS INC., Waterford, NY (US)

(72) Inventors: Norbert Auner, Glashütten (DE); Tobias Santowski, Langenselbold (DE); Alexander Sturm, Mainz (DE)

(73) Assignee: Momentive Performance Materials Inc., Waterford, NY (US)

(*) Notice: Subject to any disclaimer, the term of this patent is extended or adjusted under 35 U.S.C. 154(b) by 0 days.

(21) Appl. No.: 16/647,773

(22) PCT Filed: Sep. 20, 2018

(86) PCT No.: PCT/US2018/051859
§ 371 (c)(1),
(2) Date: Mar. 16, 2020

(87) PCT Pub. No.: WO2019/060485
PCT Pub. Date: Mar. 28, 2019

(65) Prior Publication Data
US 2020/0283457 A1 Sep. 10, 2020

(30) Foreign Application Priority Data

Sep. 20, 2017 (EP) ..................................... 17192237
Jun. 15, 2018 (EP) ..................................... 18177922

(51) Int. Cl.
*C07F 7/12* (2006.01)

(52) U.S. Cl.
CPC ................... *C07F 7/126* (2013.01)

(58) Field of Classification Search
CPC ........ C07F 7/126; C07F 7/081; C07F 7/0805; C07F 7/0898; C07F 7/14; C07F 7/025
See application file for complete search history.

(56) References Cited

U.S. PATENT DOCUMENTS

| 3,043,857 | A | * | 7/1962 | Jenkner | C01B 25/06 |
| | | | | | 556/102 |
| 3,535,092 | A | * | 10/1970 | Chalk | C01B 33/107 |
| | | | | | 423/342 |
| 4,115,426 | A | * | 9/1978 | Hiiro | C07F 7/126 |
| | | | | | 556/474 |
| 4,629,801 | A | * | 12/1986 | Soula | C07F 7/0896 |
| | | | | | 556/466 |
| 4,824,657 | A | * | 4/1989 | Jadhav | C01B 6/06 |
| | | | | | 423/645 |
| 5,445,367 | A | | 10/1995 | Klein et al. | |
| 5,856,548 | A | | 1/1999 | Drose et al. | |
| 6,046,350 | A | * | 4/2000 | Ikai | C07F 7/0896 |
| | | | | | 556/487 |
| 6,730,802 | B2 | * | 5/2004 | Shen | C07F 7/0896 |
| | | | | | 427/96.2 |
| 10,544,506 | B2 | * | 1/2020 | Kerrigan | C23C 16/345 |
| 2012/0114544 | A1 | * | 5/2012 | Jung | C07F 7/12 |
| | | | | | 423/342 |
| 2013/0259790 | A1 | * | 10/2013 | Wieber | C01B 33/10773 |
| | | | | | 423/342 |
| 2017/0166452 | A1 | * | 6/2017 | Auner | C01B 33/10773 |
| 2020/0223874 | A1 | * | 7/2020 | Auner | C07F 7/12 |
| 2020/0262851 | A1 | * | 8/2020 | Auner | C07F 7/126 |

FOREIGN PATENT DOCUMENTS

| JP | 2014139144 A | * | 7/2014 | | |
| RU | 2436788 C1 | * | 12/2011 | | |
| RU | 2436788 C1 | | 12/2011 | | |
| WO | WO-2013101618 A1 | * | 7/2013 | ......... | B01J 31/0244 |
| WO | WO-2013101619 A1 | * | 7/2013 | ......... | B01J 31/0288 |
| WO | WO-2018186882 A1 | * | 10/2018 | ............. | C07F 7/121 |
| WO | WO-2019060481 A1 | * | 3/2019 | ............. | C07F 7/128 |
| WO | WO-2019060485 A1 | * | 3/2019 | ............. | C07F 7/083 |
| WO | WO-2020055656 A1 | * | 3/2020 | ......... | C01B 33/1071 |

OTHER PUBLICATIONS

CAS/CASREACT Abstract of Ru 2436788 (2011) (Year: 2011).*
English-Language Machine Translation of RU 2436788 (2011) (Year: 2011).*
B. Arkles et al., 20 Chemistry a European Journal, 9422-9450 (2014) (Year: 2014).*
S. Hong et al., 29 Organometallics, 3054-3057 (2010) (Year: 2010).*
English-Language Machine Translation of JP 2014-139144 (2014) (Year: 2014).*
C. Appelt et al., 51 Angewandte Chemie, International Edition, 5911-5914 (2012) (Year: 2012).*
CAS Abstract RN = 1308317-95-6 (2011) (Year: 2011).*
CAS Abstract of C. Appelt et al., 51 Angewandte Chemie, International Edition, 5911-5914 (2012) (Year: 2012).*
W. Campbell et al., 8 Organometallics, 2615-2618 (1989) (Year: 1989).*
S. Amin et al., 129 Journal of the American Chemical Society, 2938-2953 (2007) (Year: 2007).*
C. Zheng et a., 785 Journal of Molecular Structure, 143-159 (2006) (Year: 2006).*

(Continued)

*Primary Examiner* — Alexander R Pagano
(74) *Attorney, Agent, or Firm* — James C. Abruzzo

(57) ABSTRACT

The invention relates to a process for the manufacture of organomonosilanes, in particular, bearing both hydrogen and chlorine substituents at the silicon atom by subjecting a silane substrate comprising one or more organomonosilanes, with the proviso that at least one of these silanes has at least one chlorine substituent at the silicon atom, to the reaction with one or more metal hydrides selected from the group of an alkali metal hydride and an alkaline earth metal hydride in the presence of one or more compounds (C) acting as a redistribution catalyst.

21 Claims, No Drawings

(56) References Cited

OTHER PUBLICATIONS

Kornev and Semenov (Metallorg. Khim 4 (1991) 4, 860-863.
https://en.wikipedia.org/wiki/Organyl_group.
https://goldbook.iupac.org/html/O/O04329.html.
International Search Report and Written Opinion from PCT/US2018/051859 dated Jan. 16, 2019.

* cited by examiner

PROCESS FOR THE PRODUCTION OF ORGANOHYDRIDOCHLOROSILANES

CROSS-REFERENCE TO RELATED APPLICATIONS

The present application is a U.S. National Phase Application of PCT International Application No. PCT/US2018/051859, filed on Sep. 20, 2018, to which priority is claimed from EP Patent Application No. 17192237.0 filed Sep. 20, 2017, and EP Patent Application No. 18177922.4 filed Jun. 15, 2018 both of which are incorporated herein by reference in their entireties.

TECHNICAL FIELD

The present invention relates to the production of organohydridomonosilanes, in particular to the production of mono- and dichlorohydridosilanes. More specifically, the invention relates to a process for the production of hydridochlorosilanes starting from organochlorosilanes.

BACKGROUND OF THE INVENTION

Organohydridosilanes are highly useful starting materials in synthetic organosilicon chemistry, and therefore constitute an industrially valuable class of compounds. Such organosilanes bearing both chloro- and hydrido substituents constitute attractive starting materials in synthesis due to their bifunctional nature, which means they have functional groups of different reactivities. The chloride substituent is a better leaving group than the hydride group and allows, for instance, the controlled addition of further monomeric or oligomeric siloxane units with retention of the Si—H bond under mild conditions, thereby rendering said chlorohydridosilanes useful as blocking and coupling agents in the synthesis of defined oligo- and polysiloxanes.

Such compounds generally find a wide range of applications, for instance for the manufacture of adhesives, sealants, mouldings, composites and resins for example in the fields of electronics, automotive, construction and many more.

The Si—H moieties present in hydridochlorosilanes can be utilized for post-synthesis modifications and functionalizations, for instance for the introduction of organic residues to polyorganosiloxanes or for cross-linking by hydrosilylation reactions, which is desirable in various kinds of compositions containing polyorganosiloxanes.

Synthesis of functionalized polysiloxanes starting with transformations via the Si—H bond(s) followed by hydrolysis or alcoholysis of the Si—Cl bond(s) and optionally condensation for the formation of polysiloxanes is also viable.

Although there is a high demand for such bifunctional silanes having both Si—H and Si—Cl bonds, there is no practical, economically reasonable or sustainable industrial process for the synthesis of such building blocks disclosed yet. In particular for the chlorohydridosilanes MeSiHCl$_2$ and Me$_2$SiHCl, there is a strong need for such a production process.

Many procedures for the production of chlorosilanes containing both Si—H and Si—Cl bonds are based on organohydridosilanes serving as starting materials. The preparation of organosilicon hydrides and organosilicon compounds containing both Si—H and Si—Cl bonds from organosilicon halides, in particular, organosilicon chlorides, is also known in the art:

U.S. Pat. No. 5,455,367 discloses a method for the synthesis of hydrido organosilanes by the reduction of organosilicon chlorides with MgH$_2$ in an ether solvent and the parallel use of ultrasound or mechanical energy (e. g. ball milling) to remove the magnesium halide from the MgH$_2$ particles. Synthesis of dimethylsilane is illustrated in Example 1 of the document.

U.S. Pat. No. 5,856,548 discloses a process for preparation of Me$_2$SiHCl via partial reduction of Me$_2$SiCl$_2$ in a reaction system comprising MgH$_2$ and AlCl$_3$ in a non-polar organic solvent while milling continuously.

A method for the preparation of Me$_2$SiHCl by monoreduction of Me$_2$SiCl$_2$ using NaBH$_4$ or a mixture of NaBH$_4$ and NaH in dimethylimidazolidine or hexamethylphosphoramide (HMPA) is disclosed in U.S. Pat. No. 4,115,426 A (Hiiro, Sakurai, Kondo, 1978).

The mono-, di- and trihydrogenation of organochlorosilanes with LiH in ethers, e.g. tetrahydrofurane (THF), dimethoxyethane (DME) and bis(2-methoxyethyl) ether (diglyme), in high yields was reported by Kornev and Semenov (Metallorg. Khim 4 (1991) 4, 860-863).

The reduction of the Si—Cl to Si—H moieties of Me$_3$SiCl, Me$_2$SiHCl, Me$_2$SiCl$_2$, MeSiHCl$_2$, and Et$_3$SiCl by LiH in THF at temperatures of 25-67° C. is disclosed in U.S. Pat. No. 4,824,657 (Jadhav, 1989). Therein, the LiH is first heated in THF before the compounds containing Si—Cl moieties are added.

RU 2 436 788 C1 discloses the reaction of trimethylchlorosilane with lithium hydride in the presence of tetrakis (diethylamido phosphonium bromide) in toluene at 65-74° C. whereby trimethylsilane is formed. Tetrakis(diethylamido phosphonium bromide):

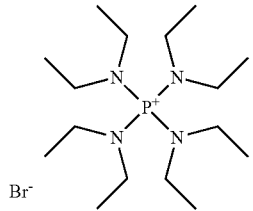

acts as an activator for LiH not as redistribution catalyst. It also does not have organyl substitution, which requires a bond via carbon atom (see e.g. https://en.wikipedia.org/wiki/Organyl_group, or https://goldbook.iupac.org/html/O/O04329.html), but has amido substitution via nitrogen atom. RU 2 436 788 C1 yields solely organohydridosilanes but no mixed chlorohydridosilanes, which may be well due to the absence of a redistribution catalyst.

Problem to be Solved

The problem to be solved by the present invention is the provision of a process for the production of organohydridomonosilanes, in particular mono- and dichlorohydridoorganosilanes from chlorosilanes. In particular, it is the object of present invention to provide a new process with improved performance over the methods known in the art regarding yield of the reaction, purity of products, selectivity of the conversion, convenience of the reaction procedure, convenience of the work-up procedure, easy handling of the reagents and cost efficiency of the process.

According to the present invention, this problem is solved as follows.

DETAILED DESCRIPTION OF THE INVENTION

The present invention relates to a process for the production of hydridochloromonosilanes starting from chlorine-substituted monosilanes, by in particular reduction or hydrogenation and redistribution of the substituents attached to the silicon atoms.

Subject of the invention is a process for the manufacture of monosilanes of the general formula (I):

wherein R is an organyl group,
x=1 to 3, preferably 1 to 2,
y=1 to 3, preferably 1 to 2,
z=0 to 3, preferably 1 to 2, and
x+y+z=4,
comprising:
A) the step of subjecting a silane substrate comprising one or more monosilanes of the general formula (II)

wherein R is as defined above
a=1 to 3,
b=0 to 3,
c=0 to 3, preferably 1 to 3, and
a+b+c=4,
with the proviso that at least one silane of the formula (II) has at least one chlorine substituent at the silicon atom,
to the reaction with one or more metal hydrides selected from the group consisting of an alkali metal hydride and an alkaline earth metal hydride, preferably lithium hydride, in the presence of one or more compounds (C) selected from the group consisting of:

$R^1_4PCl$, wherein $R^1$ is selected from the group consisting of hydrogen and an organyl group, which can be the same or different, preferably $R^1$ is selected from R as defined above, more preferably $R^1$ is selected from the group consisting of an aromatic group and an aliphatic hydrocarbon group, even more preferably a n-alkyl group, and most preferably a n-butyl group, phosphines $R^1_3P$, wherein $R^1$ is selected from the group consisting of hydrogen and an organyl group and can be the same or different, preferably $R_3P$, wherein R is as defined above and can be the same or different, such as preferably $PPh_3$, amines $R^1_3N$, wherein $R^1$ is selected from the group consisting of hydrogen and an organyl group and can be the same or different, preferably $R_3N$, wherein R is as defined above and can be the same or different, such as preferably n-$Bu_3N$, N-heterocyclic amines, preferably methylimidazoles, such as 2-methylimidazole, 4-methylimidazole and 1-methylimidazole, and ammonium compounds, such as $R^1_4NCl$, wherein $R^1$ is selected from the group consisting of hydrogen and an organyl group and can be the same or different, preferably $R_4NCl$, wherein R is as defined above and can be the same or different, such as preferably n-$Bu_4NCl$, and B) optionally a step of separating the resulting monosilanes of the general formula (I).

It will be understood that any numerical range recited herein includes all sub-ranges within that range and any combination of the various endpoints of such ranges or sub-ranges, be it described in the examples or anywhere else in the specification.

It will also be understood herein that any of the components of the invention herein as they are described by any specific genus or species detailed in the examples section of the specification, can be used in one embodiment to define an alternative respective definition of any endpoint of a range elsewhere described in the specification with regard to that component, and can thus, in one non-limiting embodiment, be used to supplant such a range endpoint, elsewhere described.

It will be further understood that any compound, material or substance which is expressly or implicitly disclosed in the specification and/or recited in a claim as belonging to a group of structurally, compositionally and/or functionally related compounds, materials or substances includes individual representatives of the group and all combinations thereof.

While the above description contains many specifics, these specifics should not be construed as limitations on the scope of the invention, but merely as exemplifications of preferred embodiments thereof. Those skilled in the art may envision many other possible variations that are within the scope and spirit of the invention as defined by the claims appended hereto.

In the process of the present invention, preferably one compound of the general formula (I) or a mixture of more than one compounds of general formula (I) is formed.

In a preferred embodiment of the invention in formula (I):
x=1 to 2,
y=1 to 2, and
z=1 to 2.

Preferably, the substituent R represents an organyl group, which is bound to the silicon atom via a carbon atom, and which organyl group can be the same or different. Preferably the organyl group is an optionally substituted, more preferably unsubstituted group, which is selected from the groups consisting of: alkyl, aryl, alkenyl, alkynyl, alkaryl, aralkyl, aralkenyl, aralkynyl, cycloalkyl, cycloalkenyl, cycloalkynyl, cycloaralkyl, cycloaralkenyl, and cycloaralkynyl, even more preferably selected from alkyl, cycloalkyl, alkenyl and aryl, even further preferred selected from methyl, vinyl and phenyl, and most preferably R is a methyl group (herein abbreviated as Me).

$R^1$ is hydrogen or an organyl group, wherein the organyl group is preferably as defined as in the definition of R above.

In accordance with the present invention, an organyl group is any organic substituent group, regardless of functional type, having one free valence at a carbon atom.

Preferably, the monosilanes of the general formula (I) formed in the process of the present invention include compounds selected from the group of: $RSiH_2Cl$, $R_2SiHCl$, $RSiHCl_2$, more preferably from $R_2SiHCl$ and $RSiHCl_2$, with R as defined above.

Further preferably, the monosilanes of the general formula (I) formed in the process of the present invention are selected from the group of: $MeSiH_2Cl$, $Me_2SiHCl$, $MeSiHCl_2$, more preferably from $Me_2SiHCl$ and $MeSiHCl_2$.

According to the present invention, the silane substrate comprising one or more monosilanes of the general formula (II) includes any mixture comprising one or more of the silanes of the general formula (II). Herein, in an embodiment, the silane substrate preferably comprises more than about 50 weight-% of silanes of the general formula (II) and optionally other silanes, more preferably more than about 75 weight-% of silanes of the general formula (II) and optionally other silanes, and even more preferably more than about 90 weight-% and most preferably more than about 95 weight-%. of silanes of the general formula (II) and optionally other silanes.

The term "other silanes" herein comprises mono-, di-, oligo and polysilanes as well as carbosilanes not falling under the general formulae (II), wherein the silanes may be substituted with organyl-, chlorine- and hydrogen substituents.

In accordance with the present invention, the term "subjecting to the reaction" refers to any way of combining the silane substrate, the one or more metal hydrides and the one or more compounds (C) in order to perform a reaction of the silane substrate leading to the formation of products of the general formula (I), preferably in an open or closed reaction vessel, wherein the reaction may be performed in a continuous or a batch-wise manner.

Herein, the products of the general formula (I) are formed by the full or partial reduction of a part of the silane substrate and suitably a simultaneous redistribution reaction catalyzed by one or more compounds (C).

According to the present invention, the term "redistribution reaction" describes the redistribution of hydrogen, chlorine substituents and/or organyl groups, preferably of hydrogen and chlorine substituents, bound to silicon atoms of one or more silane compounds comprised in the reaction mixture by exchange of these substituents. The exchange can be monitored in particular by $^{29}$Si NMR, by GC and/or GC/MS. The redistribution reactions are catalyzed by the compounds (C).

Preferably, by the redistribution reaction of silanes bearing only chlorine substituents at the silicon atoms and silanes bearing only hydrogen substituents at the silicon atoms formed under reaction conditions silanes of the general formula (I) bearing both hydrogen and chlorine substituents at the silicon atom are obtained.

The redistribution reaction of silanes in the context of the present invention includes in particular the comproportionation of two different methylsilanes (one having only chlorine as additional substituents, and one having only hydrogen as additional substituents) with the formation of one specific chlorohydridomethylsilane, such as e.g.

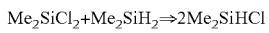
$Me_2SiCl_2+Me_2SiH_2 \Rightarrow 2Me_2SiHCl$

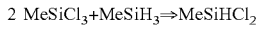
$2MeSiCl_3+MeSiH_3 \Rightarrow MeSiHCl_2$ opposite to the undesired disproportionation where a chlorohydridomethylsilane react to form two different methylsilanes (one having only chlorine as additional substituents, and one having only hydrogen as additional substituents):

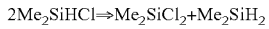
$2Me_2SiHCl \Rightarrow Me_2SiCl_2+Me_2SiH_2$

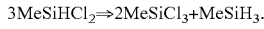
$3MeSiHCl_2 \Rightarrow 2MeSiCl_3+MeSiH_3$.

Preferably, the monosilanes comprised by the silane substrate subjected to the reaction of the process are represented by the general formula (II), wherein a is 1 or 2. More preferably, the monosilanes are represented by the general formula (II) with a=1 or 2, wherein b=0. Even more preferably, the monosilanes are represented by the general formula (II) with a=1 or 2, b=0 and R is methyl, vinyl or phenyl, in particular methyl (=Me).

Most preferably, the monosilanes represented by the general formula (II) are $MeSiCl_3$ or $Me_2SiCl_2$.

Preferably, the substrates of the general formula (II) are submitted to the reaction conditions in step A) as single compounds represented by general formula (II), or as a mixture of compounds represented by general formula (II), or as one or more mixtures comprising one or more compounds represented by general formula (II). More preferably, one or more single or specific compounds, preferably one specific compound, represented by the general formula (II) are submitted to the reaction conditions in step A).

The term "single or specific compound" in accordance with the present invention means that an isolated compound of at least about 90% purity (purity by weight) is submitted to the reaction step.

In accordance with the present invention the products of the general formula (I) are formed by subjecting the silane substrate comprising a silane of the general formula (II) to the reaction with one or more metal hydrides selected from the group of an alkali metal hydride and an alkaline earth metal hydride, more preferably lithium hydride.

In accordance with the present invention, the term metal hydride refers to any hydride donor containing at least one metal atom or metal ion. The terms "alkali metal hydride" and "alkaline earth metal hydride" refer to binary compounds consisting of hydrogen and an alkali metal or alkaline earth metal, respectively.

In preferred embodiments of the invention compounds (C) are selected from the compounds of the general formula $R^1_4PCl$, wherein $R^1$ is selected from the group consisting of hydrogen and an organyl group and can be the same or different. Preferably $R^1$ is selected from the group consisting of an aromatic group and an aliphatic hydrocarbon group, more preferably $R^1$ is an alkyl group, even more preferably $R^1$ is a n-alkyl group, and most preferably the compound of the general formula $R^1_4PCl$ is n-$Bu_4PCl$. $R^1$ is also preferably selected from R as defined above.

In preferred embodiments of the invention compounds (C) are selected from phosphines $R^1_3P$, wherein $R^1$ is selected from the group consisting of hydrogen and an organyl group and can be the same or different, preferably $R_3P$, wherein R is as defined above and can be the same or different, such as preferably $PPh_3$. Preferred are in particular triorganophosphines $PR_3$, wherein R is an organyl group, as defined above, which can be the same or different, more preferably $R^1$ is selected from the group consisting of an alkyl, a cycloalkyl and an aryl group, most preferably the phosphine $R^1_3P$ is $PPh_3$ or n-$Bu_3P$. In preferred embodiments of the invention compounds (C) are selected from amines $R^1_3N$, wherein $R^1$ is selected from the group consisting of hydrogen and an organyl group and can be the same or different, preferably $R^1_3N$ is $R_3N$, wherein R is as defined above and can be the same or different, such as preferably n-$Bu_3N$. Most preferred are triorganoamines $NR_3$, wherein R is an organyl group as defined above, more preferably R is an alkyl group, and most preferably the triorganoamine is n-$Bu_3N$ or $NPh_3$.

Preferred compounds (C) are selected from N-heterocyclic amines are methylimidazoles such as 2-methylimidazole, 4-methylimidazole and 1-methylimidazole, most preferably 2-methylimidazole.

In preferred embodiments of the invention compounds (C) are selected from ammonium compounds, such as $R^1_4NCl$, wherein $R^1$ is selected from the group consisting of hydrogen and an organyl group, and can be the same or different, preferably $R^1_4NCl$ is $R_4NCl$, wherein R is as defined above and can be the same or different, such as preferably n-$Bu_4NCl$. Preferably the compounds $R^1_4NCl$ are selected from quaternary ammonium compounds $NR_4Cl$, wherein R is an organyl group as defined above, and can be the same or different, more preferably R is an alkyl group, and most preferably the quaternary ammonium compound is n-Bu$_4$NCl.

The optional step B) of separating the resulting monosilanes of the general formula (I) refers to any technical means applied to raise the content of one or more monosilanes according to the general formula (I) in a product or reaction mixture, or which results in the separation of one or more single compounds of the formula (I) from a product mixture obtained in step A) of the process according to the invention.

Further preferably, the reaction step A) is carried out in a suitably sized reactor made of materials that are resistant to corrosion by chlorides, such as glass or Hastelloy C. A means of vigorous agitation is provided to disperse or dissolve the compound (C) and the metal hydride in the reaction mixture.

In a preferred embodiment of the process according to the invention, step A) is carried out in an organic solvent or mixtures thereof, preferably a high-boiling ether compound, more preferably 1,4-dioxane, diglyme or tetraglyme, most preferably diglyme.

According to the present invention, the term "organic solvent" refers to any organic compound which is in liquid state at room temperature, and which is suitable as a medium for conducting the reduction and redistribution reactions of step A) therein. Accordingly, the organic solvent is preferably inert to the reagents (C) according to present invention, and to hydrogenation reagents such as metal hydrides under reaction conditions. Furthermore, the starting materials of the general formula (II) and the products of the general formula (I) are preferably soluble in the organic solvent or fully miscible with the organic solvent, respectively.

Preferably, the organic solvent is selected from optionally substituted, preferably unsubstituted linear or cyclic aliphatic hydrocarbons, aromatic hydrocarbons or ether compounds, without being limited thereto.

Herein, the term "ether compound" shall mean any organic compound containing an ether group —O— (one or more ether groups are possible), in particular of the formula R$^3$—O—R$^2$, wherein R$^3$ and R$^2$ are independently selected from an organyl group R as defined above. In general, the organyl group R can be selected for example from optionally substituted, preferably unsubstituted, alkyl, aryl, alkenyl, alkynyl, alkaryl, aralkyl, aralkenyl, aralkynyl, cycloalkyl, cycloalkenyl, cycloalkynyl, cycloaralkyl, cycloaralkenyl, and cycloaralkynyl groups, preferably from alkyl, alkenyl and aryl groups.

Preferably, R$^3$ and R$^2$ are substituted or unsubstituted linear or branched alkyl groups or aryl groups, which may have further heteroatoms such as oxygen, nitrogen, or sulfur. In the case of cyclic ether compounds, R$^3$ and R$^2$ can constitute together an optionally substituted alkylene or arylene group, which may have further heteroatoms such as oxygen, nitrogen, or sulfur, as for instance in dioxanes, in particular 1,4-dioxane.

The ether compounds can be symmetrical or asymmetrical with respect to the substituents at the ether group(s) —O—.

The term "ether compound" according to the invention also comprises linear ether compounds in which more than one ether group may be included, forming a di-, tri-, oligo- or polyether compound, wherein R$_3$ and R$_2$ constitute organyl groups when they are terminal groups of the compounds, and alkylene or arylene groups when they are internal groups. Herein, a terminal group is defined as any group being linked to one oxygen atom which is part of an ether group, while an internal group is defined as any group linked to two oxygen atoms being a constituent of ether groups.

Preferred examples of such compounds are dimethoxy ethane, glycol diethers (glymes), in particular diglyme or tetraglyme, without being limited thereto.

According to the present invention, the term "high-boiling ether compound" is defined as an ether compound according to the above definition with a boiling point at about 1.01325 bar (standard atmosphere pressure) of preferably at least about 70° C., more preferably at least about 85° C., even more preferably at least about 100° C., and most preferably at least about 120° C.

The application of high-boiling ethers in the present invention is favourable as it facilitates separation of the desired products of the general formula (I) from the reaction mixture containing the solvent and residual starting materials. The products of the general formula (I) in general have lower boiling points than the high-boiling ethers as defined herein.

For example, the boiling points of selected representative products of the general formula (I) are 35° C. (Me$_2$SiHCl) and 41° C. (MeSiHCl$_2$) at atmospheric pressure, while the representative higher-boiling ether compound diglyme has a boiling point of 162° C. at standard atmosphere pressure. Application of higher-boiling ether compounds as solvents allows higher reaction temperatures and allows a more efficient separation of the desired products from the reaction mixture by distillation.

In another preferred embodiment of the process according to the invention, the monosilanes of the general formula (II) subjected to the reaction in step A) are formed in situ by cleavage of one or more compounds selected from the group of a) disilanes of the general empirical formula (III)

$$\text{ReSi}_2\text{H}_f\text{Cl}_g \qquad\qquad (III)$$

wherein R is an organyl group, as defined above
e=1 to 5,
f=0 to 5,
g=0 to 5 and
e+f+g=6, and
b) carbodisilanes of the general empirical formula (IV)

$$\text{R}_m(\text{SiCH}_2\text{S})\text{H}_n\text{Cl}_o \qquad\qquad (IV)$$

wherein R is as defined above,
m=1 to 5,
n=0 to 5,
o=0 to 5 and
m+n+o=6
with the compound (C) acting also as a cleavage catalyst, in particular with compounds of the formula R$^1_4$PCl, as defined above.

The disilanes of the general empirical formula (III)

$$\text{ReSi}_2\text{H}_f\text{Cl}_g \qquad\qquad (III)$$

can be depicted also by the structural formula:

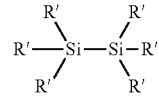

wherein the substituents R' are independently selected from organic substituents (R) as defined according to the invention, hydrogen (H) and chlorine (Cl), wherein the number of organic substituents e=1 to 5, the number of hydrogen atoms f=0 to 5 and the number of chlorine atoms g=0 to 5, and the total of e+f+g=6.

The carbodisilanes of the general empirical formula (IV)

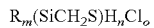

can be depicted also by the structural formula:

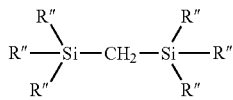

wherein the substituents R″ are independently selected from organic substituents (R) as defined according to the invention, hydrogen (H) and chlorine (Cl), and wherein the number of organic substituents m=1 to 5, the number of hydrogen atoms n=0 to 5, the number of chlorine atoms o=0 to 5, and m+n+o=6.

Preferred disilanes of the general formula (III) for the in situ cleavage leading to silane compounds of the general empirical formula (II) are $R_2Si_2Cl_4$, $R_3Si_2Cl_3$ and $R_4Si_2Cl_2$, wherein R is as defined above. More preferably, R is selected from alkyl, aryl and alkenyl groups, even more preferably from phenyl, vinyl and methyl groups.

In the entire application the meaning of the term "empirical formula" intends to mean that the formulae do not represent the structural formulae, but just sum up the chemical groups or atoms present in the molecule. For example, the empirical formula $R_2Si_2Cl_4$ may comprise the structural formulae:

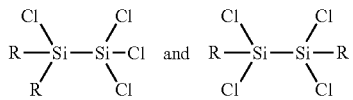

In an embodiment, particularly preferred disilanes of the general formula (III) leading to compounds of the general formula (II) via in situ cleavage are $Me_2Si_2Cl_4$, $Me_3Si_2Cl_3$ and $Me_4Si_2Cl_2$.

Preferred carbodisilanes of the general formula (IV) for the in situ cleavage leading to silane compounds of the general formula (II) are RCl₂Si—CH₂—SiCl₂R, R₂ClSi—CH₂—SiCl₂R, R₂ClSi—CH₂—SiClR₂, R₃Si—CH₂—SiCl₂R and R₃Si—CH₂—SiClR₂, wherein R is as defined above. More preferably, R is selected from alkyl, aryl and alkenyl groups, even more preferably from phenyl, vinyl and methyl groups.

Particularly preferred carbodisilanes of the general formula (III) leading to compounds of the general formula (II) via in situ cleavage are MeCl₂Si—CH₂—SiCl₂Me, Me₂ClSi—CH₂—SiCl₂Me and Me₂ClSi—CH₂—SiClMe₂.

Also preferably, the disilanes and carbodisilanes of the general formulae (III) and (IV) are can be derived from or are contained in a Direct Process Residue, or can be derived from precursors present in the Direct Process Residue by partial or complete hydrogenation.

Preferably, for the production of Me₂SiHCl, disilanes of the general formula (III) are selected for in situ cleavage from the group consisting of Me₂ClSi—SiClMe₂, Me₂ClSi—SiCl₂Me and Me₃Si—SiClMe₂, more preferably Me₂ClSi—SiClMe₂ and Me₂ClSi—SiCl₂Me, most preferably Me₂ClSi—SiClMe₂.

Preferably, for the production of MeSiHCl₂, carbodisilanes of the general formula (IV) are selected for in situ cleavage from the group consisting of MeCl₂Si—CH₂—SiCl₂Me, Me₂ClSi—CH₂—SiCl₂Me and Me₃Si—CH₂—SiCl₂Me, more preferably MeCl₂Si—CH₂—SiCl₂Me and Me₂ClSi—CH₂—SiCl₂Me, most preferably MeCl₂Si—CH₂—SiCl₂Me.

Preferably, the compound (C) which is applied as a redistribution catalyst acts as a cleavage catalyst at the same time, and products of the general formula (I) are formed by cleavage of silanes of the general formulae (III) and (IV) and reduction and redistribution reactions taking place before, during or after the cleavage reactions in step A).

Preferably, the compound (C) causing the cleavage of the substrates of the general formulae (III) and (IV) is selected from the group of phosphonium chlorides, preferably $R^1_4PCl$, as defined above, wherein $R^1$ is selected from the group consisting of hydrogen and an organyl group, which can be the same or different, preferably $R^1$ is selected from R as defined above, more preferably $R^1$ is selected from the group consisting of an aromatic group and an aliphatic hydrocarbon group, even more preferably a n-alkyl group, and most preferably a n-butyl group.

N-heterocyclic amines, preferably as defined above, preferably methylimidazoles, such as 2-methylimidazole, 4-methylimidazole and 1-methylimidazole, and ammonium compounds, preferably as defined above, such as $R^1_4NCl$, wherein $R^1$ is selected from the group consisting of hydrogen and an organyl group and can be the same or different, preferably R₄NCl, wherein R is as defined above and can be the same or different, such as preferably n-Bu₄NCl.

In another preferred embodiment of the process according to the invention, in general formula (I) and one or more of the silanes of the general formula (II) R is an alkyl or cycloalkyl group, preferably a methyl group.

Preferably, in general formula (I) and one or more of the silanes of the general formulae (II) R is an alkyl or cycloalkyl group, more preferably an alkyl or cycloalkyl group having 1 to about 20 carbon atoms, even more preferably an alkyl or cycloalkyl group having 1 to about 10 carbon atoms, even further preferably 1 to about 6 carbon atoms, and most preferably R is a methyl group.

In a preferred embodiment of the process according to the invention, all silanes of the formula (II) in step A) have at least one chlorine substituent at the silicon atom.

Preferably, all silanes of the formula (II) have at least one chlorine substituent at the silicon atom, more preferably all silanes of the formula (II) have more chlorine substituents at the silicon atom than hydrogen substituents.

In a further preferred embodiment of the process according to the invention, all silanes of the formula (II) have no hydrogen substituent at the silicon atom.

Preferably, all silanes of the general formula (II) have no hydrogen substituent at the silicon atom, more preferably all silanes of the general formula (II) have no hydrogen substituent and 1 or 2 substituents R at the silicon atom, wherein R is an organyl group preferably methyl.

In another preferred embodiment of the process according to the invention, the silane substrate comprises greater than about 90 wt-% of one single or specific silane of the formula (II) having at least one chlorine substituent at the silicon atom, based on the total amount of the silane substrate.

Preferably, the silane substrate comprises greater than about 90 wt-% of one single or specific silane of the formula (II) having at least one chlorine substituent at the silicon atom, more preferably the silane substrate comprises greater than about 90 wt-% of one single silane having more chlorine substituents than hydrogen substituents at the silicon atom, based on the total amount of the silane substrate.

In another further preferred embodiment of the process according to the invention, the silane substrate comprises greater than about 90 wt-% of one single or specific silane of the formula (II) having no hydrogen substituent at the silicon atom, based on the total amount of the silane substrate.

Preferably, the substrate comprises greater than about 90 wt-% of one single or specific silane of the formula (II) having no hydrogen substituent at the silicon atom, more preferably the silane has no hydrogen substituent and 1 or 2 substituents R at the silicon atom, wherein R is an organyl group as defined above, based on the total amount of the silane substrate.

In a preferred embodiment of the process according to the invention, the silane substrates of the general formula (II) having one or more hydrogen substituent at the silicon atom in step A) are prepared by a prehydrogenation step of silanes prior to step A). But normally this is not required since, due to the presence of metal hydrides in step A), hydrogenation can be effected.

Herein, all silane substrates having one or more hydrogen substituent at the silicon atom in step A) may be prepared by a hydrogenation step prior to step A), or only a part of the silane substrates having one or more hydrogen substituent at the silicon atom in step A) may be prepared by a hydrogenation reaction prior to step A).

According to the invention, the term "hydrogenation" refers to the exchange of one or more chlorine substituents at silicon atoms by the same number of hydrogen substituents.

Preferably, the hydrogenation reactions prior to step A) leading to hydrogenated substrates of the general formulae (II), (and as far they are prepared in situ from (III) and (IV) leading to hydrogenated substrates (III) and (IV)) are performed with a hydride donor selected from the group of metal hydrides, preferably complex metal hydrides and organometallic hydride reagents such as $LiAlH_4$, $n-Bu_3SnH$, $NaBH_4$, $i-Bu_2AlH$ or sodium bis(2-methoxyethoxy) aluminumhydride.

According to the invention, the term hydride donor refers to any compound which is capable of donating at least one hydride anion in a reaction leading to the substrates of the general formula (II).

In accordance with present invention, the term metal hydride refers to any hydride donor containing at least one metal atom or metal ion.

The term "complex metal hydrides" according to the invention refers to metal salts wherein the anions contain hydride anions. Typically, complex metal hydrides contain more than one type of metal or metalloid. As there is neither a standard definition of a metalloid nor complete agreement on the elements appropriately classified as such, in the sense of present invention the term "metalloid" comprises the elements boron, silicon, germanium, arsenic, antimony, tellurium, carbon, aluminum, selenium, polonium, and astatine.

The term "organometallic hydride reagent" refers to compounds that contain bonds between carbon and metal atoms, and which are capable of donating at least one hydride anion used in a hydrogenation reaction leading to substrates of the general formula (II).

In a further preferred embodiment of the process according to the invention, the amount of the metal hydride in step A) in relation to the silane substrate compounds to be hydrogenated is in the range of about 0.05 mol-% to about 395.95 mol-%, preferably about 20 mol-% to about 200 mol-%, more preferably about 50 mol-% to about 150 mol-%, and most preferably about 80 mol-% to about 100 mol-%. Herein, the molar ratio in % is defined as

[$n$ (metal hydride added to the reaction mixture in step $A$))/$n$ (silane substrate compounds of the general formulae (II), and if used for in situ preparation (III) and (IV))]×100.

Such molar ratios can be also applied in the prehydrogenation step.

For the determination of this ratio, all compounds being monosilanes of the general formula (II), and if used for in situ preparation disilanes of the general formula (III) and carbodisilanes of the general formula (IV) submitted to the reaction step A) are considered, regardless if they are submitted as a part of a mixture comprising other compounds, in particular disilanes and carbodisilanes which do not fall under the general formulae (II), (Ill) or (IV).

In a further preferred embodiment of the process according to the invention, the amount of the one or more compounds (C) in step A) in relation to the silane substrate compounds is in the range of about 0.0001 mol-% to about 600 mol-%, more preferably about 0.01 mol-% to about 20 mol-%, even more preferably about 0.05 mol-% to about 2 mol-%, and most preferably about 0.05 mol-% to about 1 mol-%. Herein, the molar ratio in % is defined as

[$n$ (compound or compounds (C) in step $A$))/$n$ (silane substrate compounds of the general formulae (II), and if used for in situ preparation (III) and (IV))]×100.

For the determination of this ratio, all compounds falling under the definition of the compound (C), are considered, and all compounds being monosilanes of the general formula (II), and if used for in situ preparation disilanes of the general formula (III) and carbodisilanes of the general formula (IV) submitted to the reaction step A) are considered, regardless if they are submitted as a part of a mixture comprising other silane compounds, in particular disilanes and carbodisilanes which do not fall under the general formulae (II), (Ill) or (IV).

In another preferred embodiment of the process according to the invention, in the step A) the weight ratio of the silane substrates in step A) to the organic solvent is in the range of about 0.01 to about 100, preferably in the range of about 0.1 to about 10, more preferably about 0.5 to about 4, most preferably about 0.5 to about 1. Herein, the weight ratio is defined as

[$m$ (silane substrate compounds of the general formulae (II), (III) and (IV) in step $A$))/$m$ (organic solvents in step $A$))].

For the determination of this ratio, all compounds being monosilanes of the general formula (II), and if used for in situ preparation disilanes of the general formula (III) and carbodisilanes of the general formula (IV) submitted to the reaction step A) are considered, regardless if they are submitted as a part of a mixture comprising other compounds, in particular disilanes and carbodisilanes which do not fall under the general formulae (II), (Ill) or (IV).

In a preferred embodiment of the process according to the invention, the step A) is conducted at a temperature of about 0° C. to about 300° C., preferably about 20° C. to about 160° C., more preferably about 20° C. to about 140° C.

According to the invention, the reaction temperature in step A) is the temperature of the reaction mixture, i.e. the temperature measured inside the reaction vessel in which the reaction is conducted.

In an also preferred embodiment of the process according to the invention, the step A) is conducted at a pressure of about 0.1 bar to about 30 bar, preferably about 1 bar to about 20 bar, most preferably about 1 bar to about 10 bar.

The indicated pressure ranges refer to the pressure measured inside the reaction vessel used when conducting reaction step A).

In another preferred embodiment of the process according to the invention, the methyl monosilanes of the formula (I) are selected from the group consisting of $Me_2SiHCl$, $MeSiHCl_2$ and $MeSiH_2Cl$.

In a further preferred embodiment of the process according to the invention, the methylmonosilanes of the formula (I) are selected from the group consisting of $Me_2SiHCl$ and $MeSiHCl_2$.

Preferably, the methylmonosilane of the formula (I) is $Me_2SiHCl$, and it is preferably produced by submitting $Me_2SiCl_2$ to the reaction step A), more preferably $Me_2SiHCl$ is produced by submitting $Me_2SiCl_2$ to the reaction step A) in the presence of lithium hydride, and most preferably $Me_2SiHCl$ is produced by submitting $Me_2SiCl_2$ to the reaction step A) in the presence of lithium hydride and a compound (C) of the general formula $R^1_4PCl$, wherein $^1R$ is as defined above, preferably a n-butyl group.

Also preferably, the methylmonosilane of the formula (I) is $MeSiHCl_2$, and it is preferably produced by submitting $MeSiCl_3$ to the reaction step A), more preferably $MeSiHCl_2$ is produced by submitting $MeSiCl_3$ to the reaction step A) in the presence of lithium hydride, and most preferably $MeSiHCl_2$ is produced by submitting $MeSiCl_3$ to the reaction step A) in the presence of lithium hydride and a compound (C) of the general formula $R^1_4PCl$, wherein $R^1$ is as defined above, preferably a n-butyl group.

In a further preferred embodiment of the process according to the invention, the silanes of the general formula (II) are selected from the group consisting of $Me_2SiCl_2$ and $MeSiCl_3$.

Preferably, $Me_2SiCl_2$ is reacted to the monosilane of the general formula (I) $Me_2SiHCl$ in step A).

Also preferably, $MeSiCl_3$ is reacted to the monosilane of the general formula (I) $MeSiHCl_2$ in step A).

In a preferred embodiment of the process according to the invention, step A) is carried out in the presence of at least one compound (C) of the formula $R^1_4PCl$, wherein $R^1$ is as defined above.

Preferably, in the formula $R^1_4PCl$ of a compound (C), $R^1$ is a hydrogen or an organyl group which can be the same or different, more preferably $R^1$ is an aromatic group or an aliphatic hydrocarbon group, even more preferably $R^1$ is an alkyl or cycloalkyl group, even further preferably $R^1$ is a n-alkyl group, and most preferably the compound of the general formula $R^1_4PCl$ is n-$Bu_4PCl$.

In another preferred embodiment of the process according to the invention, the compounds of formula $R^1_4PCl$ are formed in situ from compounds of the formulae $R^1_3P$ and $R^1Cl$, wherein $R^1$ is H or an organyl group.

According to the invention, $R^1$ in $R^1_4PCl$ formed in situ can be the same or different, and preferably the $R^1$ are the same and $R^1Cl$ is HCl or a chloroalkane, more preferably $R^1Cl$ is a 1-chloroalkane with up to about 20 carbon atoms, even more preferably $R^1Cl$ is a 1-chloroalkane with up to about 10 carbon atoms, and most preferably $R^1Cl$ is 1-chlorobutane.

The term "formed in situ" in the sense of the invention means that the compound $R^1_4PCl$, wherein $R^1$ is as defined above, is formed from $R^1_3P$ and $R^1Cl$ by combination of the compounds in the reaction vessel in which reaction step A) is performed.

In an also preferred embodiment of the process according to the invention, step A) is carried out in the presence of at least one compound of the formula $R^1_4PCl$, wherein $R^1$ is as defined above, and lithium hydride.

Preferably, step A) is carried out in the presence of lithium hydride and at least one compound of the formula $R^1_4PCl$, wherein $R^1$ is preferably an organyl group and can be the same or different. More preferably, step A) is carried out as described above, wherein the silane substrates of the general formulae (II), and—if used in in situ cleavage—(III) or (IV) do not have any hydrogen substituents at the silicon atoms. Even more preferably, step A) is carried out as described before, wherein the silane substrates submitted to the reaction are selected from $Me_2SiCl_2$ and $MeSiCl_3$.

In a further preferred embodiment of the process according to the invention, step A) is carried out in the presence of n-$Bu_4PCl$.

In an embodiment preferably, step A) is carried out in the presence of n-$Bu_4PCl$ and in the presence of lithium hydride as alkaline metal hydride, more preferably step A) is carried out in the presence of lithium hydride and a high-boiling ether compound, most preferably in the presence of lithium hydride and a high-boiling ether compound selected from the group of diglyme, tetraglyme and 1,4-dioxane, and mixtures thereof.

Also preferably, step A) is carried out in the presence of n-$Bu_4PCl$, wherein $Me_2SiCl_2$ or $MeSiCl_3$ are submitted to the reaction step, more preferably step A) is carried out in the presence of n-$Bu_4PCl$, wherein $Me_2SiCl_2$ or $MeSiCl_3$ are submitted to the reaction step in the further presence of lithium hydride.

Further preferably, step A) is carried out in the presence of n-$Bu_4PCl$, wherein the silane substrate submitted to the reaction comprises disilanes of the general formula (III) for in situ cleavage, more preferably disilanes of the general formula (III) not bearing any hydrogen substituents at the silicon atoms, most preferably the disilanes are selected from the group of $Me_2Si_2Cl_4$, $Me_3Si_2Cl_3$ and $Me_4Si_2Cl_2$.

In another further preferred embodiment of the process according to the invention, step A) is carried out in the presence of n-$Bu_4PCl$ and lithium hydride.

Preferably, the products obtained from step A) carried out in the presence of n-$Bu_4PCl$ and lithium hydride are selected from the compounds of the general formulae (I) $RSiHCl_2$ and $R_2SiHCl$, wherein R is selected from cycloalkyl, alkyl, aryl and alkenyl groups, more preferably R in $RSiHCl_2$ and $R_2SiHCl$, obtained from step A) carried out in the presence of n-$Bu_4PCl$ and lithium hydride, is selected from methyl, vinyl and phenyl groups, most preferably R is a methyl group.

In a preferred embodiment of the process according to the invention, in step A) $Me_2SiHCl$ is produced by the reaction of $Me_2SiCl_2$ with lithium hydride in the presence of at least one compound of the formula $R^1_4PCl$, wherein $R^1$ is as defined above, in a high-boiling ether compound.

Preferably, for the production of $Me_2SiHCl$ in step A) with lithium hydride in the presence of at least one compound of the formula $R^1_4PCl$, wherein $R^1$ is as defined above, in a high-boiling ether compound $Me_2SiCl_2$ is submitted to step A) as only silane substrate or in a mixture with other silanes.

More preferably, $Me_2SiCl_2$ is submitted to step A) as only silane substrate.

According to the invention, the compound $Me_2SiCl_2$ submitted to step A) here preferably is at least about 90% pure (purity by weight).

In a further preferred embodiment of the process according to the invention, in step A) $Me_2SiHCl$ is produced by the reaction of $Me_2SiCl_2$ with lithium hydride in the presence of n-$Bu_4PCl$ in diglyme as solvent.

Preferably, for the production of $Me_2SiHCl$ in step A) with lithium hydride in the presence of n-$Bu_4PCl$ in diglyme as solvent $Me_2SiCl_2$ is submitted to step A) as only silane substrate or in a mixture with other silanes.

More preferably, $Me_2SiCl_2$ is submitted to step A) as only silane substrate.

According to the invention, the compound $Me_2SiCl_2$ submitted to step A) here is at least about 90% pure (purity by weight).

In another preferred embodiment of the process according to the invention, in step A) $MeSiHCl_2$ is produced by the reaction of $MeSiCl_3$ with lithium hydride in the presence of at least one compound of the formula $R^1_4PCl$, wherein $R^1$ is as defined above, in a high-boiling ether compound.

Preferably, for the production of $MeSiHCl_2$ in step A) with lithium hydride in the presence of at least one compound of the formula $R^1_4PCl$, wherein $R^1$ is as defined above, in a high-boiling ether compound $MeSiCl_3$ is submitted to step A) as only silane substrate or in a mixture with other silanes.

More preferably, $MeSiCl_3$ is submitted to step A) as only silane substrate.

According to the invention, the compound $MeSiCl_3$ submitted to step A) here preferably is at least about 90% pure (purity by weight).

In still another preferred embodiment of the process according to the invention, in step A) $MeSiHCl_2$ is produced by the reaction of $MeSiCl_3$ with lithium hydride in the presence of n-$Bu_4PCl$ in diglyme as solvent.

Preferably, for the production of $MeSiHCl_2$ in step A) with lithium hydride in the presence of n-$Bu_4PCl$ in diglyme as solvent $MeSiCl_3$ is submitted to step A) as only silane substrate or in a mixture with other silanes.

More preferably, $MeSiCl_3$ is submitted to step A) as only silane substrate.

According to the invention, the compound $MeSiCl_3$ submitted to step A) here is at least about 90% pure (purity by weight).

The process of the present invention can be performed in a continuous or batch-wise manner, preferably it is carried out in a continuous manner. Therein step A) and/or B) can be performed in a continuous or batch-wise manner, preferably both steps A) and B) are performed in a continuous manner.

In a preferred embodiment of the process according to the invention, the step of separating the resulting monosilanes of the formula (I) is carried out by distillation and/or condensation.

The term "distillation" in accordance with the present invention relates to any process for separating components or substances from a liquid mixture by selective evaporation and condensation. Therein, distillation may result in practically complete separation of the constituents of a mixture, thus leading to the isolation of nearly pure compounds, or it may be a partial separation that increases the concentration of selected constituents of the mixture in the distillate when compared to the mixture submitted to distillation.

Preferably, the distillation processes which may constitute separation step B) can be simple distillation, fractional distillation, vacuum distillation, short path distillation or any other kind of distillation known to the skilled person.

Also preferably, the step B) of separating the monosilanes of the formula (I) according to the invention can comprise one or more batch distillation steps, or can comprise a continuous distillation process.

Further preferably, the term "condensation" may comprise separation or enrichment of one or more compounds of the general formula (I) from the reaction mixture by volatilization from the reaction vessel and condensation as a liquid and/or solid in a refrigerated vessel from which it can be subsequently recovered by distillation, or by solution in an ether solvent. Alternatively preferred, the monosilanes can be absorbed in an ether solvent contained in a refrigerated vessel.

In a preferred embodiment of the process according to the invention, the process is performed under inert conditions.

In the sense of present invention, the term "performed under inert conditions" means that the process is partially or completely carried out under the exclusion of surrounding air, in particular of moisture and oxygen. In order to exclude ambient air from the reaction mixture and the reaction products, closed reaction vessels, reduced pressure and/or inert gases, in particular nitrogen or argon, or combinations of such means may be used.

In a preferred embodiment of the invention, methylmonosilanes of the general formula (I) as defined above are obtained by the process according to any of the previous embodiments. In another preferred embodiment of the invention, compositions comprising at least one methylmonosilane of the general formula (I) as defined above are obtained by the process according to any of the previous embodiments.

PREFERRED EMBODIMENTS OF THE INVENTION

In the following the preferred embodiments of the invention are shown.

1. Process for the manufacture of monosilanes of the general formula (I):

$$R_xSiH_yCl_z \quad (I),$$

wherein R is an organyl group,
x=1 to 3, preferably 1 to 2,
y=1 to 3, preferably 1 to 2,
z=0 to 3, preferably 1 to 2, and
x+y+z=4,
comprising:
A) the step of subjecting a silane substrate comprising one or more monosilanes of the general formula (II)

$$R_aSiH_bCl_c \quad (II)$$

wherein R is as defined above,
a=1 to 3,
b=0 to 3,
c=0 to 3, preferably 1 to 3, and
a+b+c=4,
with the proviso that at least one silane of the general formula (II) has at least one chlorine substituent at the silicon atom,
to the reaction with one or more metal hydrides selected from the group consisting of an alkali metal hydride and an alkaline earth metal hydride, preferably lithium hydride, in the presence of one or more compounds (C) selected from the group of:
$R^1_4PCl$, wherein $R^1$ is selected from the group consisting of hydrogen and an organyl group, which can be the same or different, preferably $R^1$ is selected from R as defined above, more preferably $R^1$ is selected from the group consisting of an aromatic group and an aliphatic hydrocarbon group, even more preferably a n-alkyl group, and most preferably a n-butyl group,
  phosphines $R^1_3P$, wherein $R^1$ is selected from the group consisting of hydrogen and an organyl group and can be the same or different, preferably $R_3P$, wherein R is as defined above and can be the same or different, such as preferably $PPh_3$,
  amines $R^1_3N$, wherein $R^1$ is selected from the group consisting of hydrogen and an organyl group and can be the same or different, preferably $R^1_3N$, is $R_3N$, wherein R is as defined above and can be the same or different, such as preferably $n-Bu_3N$,
  N-heterocyclic amines, preferably methylimidazoles, such as 2-methylimidazole, 4-methylimidazole and 1-methylimidazole, and
  ammonium compounds, such as $R^1_4NCl$, wherein $R^1$ is selected from the group consisting of hydrogen and an organyl group and can be the same or different, preferably $R_4NCl$, wherein R is as defined above and can be the same or different, such as preferably $n-Bu_4NCl$, and
B) optionally a step of separating the resulting monosilanes of the general formula (I) from the reaction mixture.

2. The process according to embodiment 1, wherein step A) is carried out in one or more organic solvents, preferably selected from high-boiling ether compounds, more preferably step A) is carried out in 1,4-dioxane, diglyme or tetraglyme or mixtures thereof, most preferably diglyme.

3. The process according to embodiments 1 or 2, wherein the monosilanes of the general formula (II) subjected to the reaction in step A) are formed by in situ cleavage of one or more compounds selected from
  a) disilanes of the general empirical formula (III)

  (III)

wherein R is an organyl group,
  e=1 to 5,
  f=0 to 5,
  g=0 to 5 and
  e+f+g=6, or
  b) carbodisilanes of the general empirical formula (IV)

  (IV)

wherein R is as defined above,
  m=1 to 5,
  n=0 to 5,
  o=0 to 5 and
  m+n+o=6
  preferably with the compound (C), as defined above, acting also as a cleavage catalyst, in particular with compound (C) being one or more compounds of the formula $R^1_4PCl$, as defined above.

4. The process according to any of the previous embodiments, wherein in general formula (I) and one or more of the silanes of the general formula (II) R is an alkyl or cycloalkyl group, preferably a methyl group.

5. The process according to any of the previous embodiments, wherein all silanes of the formula (II) in step A) have at least one chlorine substituent at the silicon atom.

6. The process according to any of the previous embodiments, wherein all silanes of the formula (II) have no hydrogen substituent at the silicon atom.

7. The process according to any of the previous embodiments, wherein the silane substrate comprises more than about 90 wt-% of one single (or specific) silane of the formula (II) having at least one chlorine substituent at the silicon atom based on the total weight of the silane substrate.

8. The process according to any of the previous embodiments, wherein the silane substrate comprises more than about 90 wt-% of one single (or specific) silane of the formula (II) having no hydrogen substituent at the silicon atom based on the total amount of the silane substrate.

9. The process according to the embodiments 1 to 5 and 7 to 8, wherein silane substrates of the general formula (II) having one or more hydrogen substituent at the silicon atom in step A) are prepared by a hydrogenation reaction prior to step A).

10. The process according to any of the previous embodiments, wherein the amount of the metal hydride in step A) in relation to the silane substrate compounds is in the range of about 0.05 mol-% to about 395.95 mol-%, preferably about 20 mol-% to about 200 mol-%, more preferably about 50 mol-% to about 150 mol-%, and most preferably about 80 mol-% to about 100 mol-%.

11. The process according to any of the previous embodiments, wherein the amount of the one or more compounds (C) in step A) in relation to the silane substrate compounds is in the range of about 0.0001 mol-% to about 600 mol-%, more preferably about 0.01 mol-% to about 20 mol-%, even more preferably about 0.05 mol-% to about 2 mol-%, and most preferably about 0.05 mol-% to about 1 mol-%.

12. The process according to any of the previous embodiments, wherein in the step A) the weight ratio of the silane substrates to the organic solvent is in the range of about 0.01 to about 100, preferably in the range of about 0.1 to about 10, more preferably about 0.5 to about 4, most preferably about 0.5 to about 1.

13. The process according to any of the previous claims, wherein the step A) is conducted at a temperature of about 0° C. to about 300° C., preferably about 20° C. to about 220° C., more preferably about 20° C. to about 180° C. more preferably about 20° C. to about 160° C., more preferably about 20° C. to about 140° C.

14. The process according to any of the previous embodiments, wherein the step A) is conducted at a temperature of about 0° C. to about 300° C., preferably about 20° C. to about 160° C., more preferably about 20° C. to about 140° C.

15. The process according to any of the previous embodiments, wherein the step A) is conducted at a pressure of about 0.1 bar to about 30 bar, preferably about 1 bar to about 20 bar, most preferably about 1 bar to about 10 bar.

16. The process according to any of the previous embodiments, wherein the methyl monosilanes of the formula (I) are selected from the group consisting of $Me_2SiHCl$, $MeSiHCl_2$ and $MeSiH_2Cl$.

17. The process according to any of the previous embodiments, wherein the methylmonosilanes of the formula (I) are selected from the group consisting of $Me_2SiHCl$ and $MeSiHCl_2$.

18. The process according to any of the previous embodiments, wherein the silanes of the general formula (II) are selected from the group consisting of $Me_2SiCl_2$ and $MeSiCl_3$.

19. The process according to the previous embodiments, wherein step A) is carried out in the presence of at least one compound (C) of the formula $R^1_4PCl$, wherein $R^1$ is as defined above.

20. The process according to any previous embodiments, wherein the compounds of formula $R^1_4PCl$, wherein $R^1$ is as defined above, are formed in situ from compounds of the formulae $R^1{}_3P$ and $R^1Cl$, wherein $R^1$ is each as defined above, preferably an organyl group.

21. The process according to the previous embodiments, wherein step A) is carried out in the presence of at least one compound of the formula $R^1{}_4PCl$, wherein $R^1$ is as defined above, and lithium hydride.

22. The process according to any of the previous embodiments, wherein step A) is carried out in the presence of n-Bu$_4$PCl.

23. The process according to any of the previous embodiments, wherein step A) is carried out in the presence of n-Bu$_4$PCl and lithium hydride.

24. The process according to any of the previous embodiments, wherein in step A) Me$_2$SiHCl is produced by the reaction of Me$_2$SiCl$_2$ with lithium hydride in the presence of at least one compound of the formula $R^1{}_4PCl$, wherein $R^1$ is as defined above, in a high-boiling ether compound.

25. The process according to any of the previous embodiments, wherein in step A) Me$_2$SiHCl is produced by the reaction of Me$_2$SiCl$_2$ with lithium hydride in the presence of n-Bu$_4$PCl in diglyme as solvent.

26. The process according to the embodiments 1 to 23, wherein in step A) MeSiHCl$_2$ is produced by the reaction of MeSiCl$_3$ with lithium hydride in the presence of at least one compound of the formula $R^1{}_4PCl$, wherein $R^1$ is as defined above, in a high-boiling ether compound.

27. The process according to the embodiments 1 to 23 and 26, wherein in step A) MeSiHCl$_2$ is produced by the reaction of MeSiCl$_3$ with lithium hydride in the presence of n-Bu$_4$PCl in diglyme as solvent.

28. The process according to any of the previous embodiments, wherein the step of separating the resulting monosilanes of the formula (I) is carried out by distillation and/or condensation.

29. The process according to any of the previous embodiments, wherein the process is performed under inert conditions.

30. Methylmonosilanes of the general formula (I) as defined above, as obtainable by the process according to any of the previous embodiments.

31. Compositions comprising at least one methylmonosilane of the general formula (I) as defined above, as obtainable by the process according to any of the embodiments 1 to 30.

EXAMPLES

The present invention is further illustrated by the following examples, without being limited thereto.

General

Prior to the reactions the metal salts as well as the solvents used were carefully dried according to procedures known from the literature. The reactions investigated were generally performed in sealed NMR tubes first to prevent evaporation of low boiling reaction products, such as hydrogenated organomonosilanes, and to elucidate the reaction conditions (temperature, time) for the performed reactions. Subsequently, these conditions were exemplarily transferred onto cleavage reactions in a preparative scale in a closed system, preferably a sealed glass ampoule to avoid evaporation of low boiling reaction educts and products, e.g. organochloro- and organohydridosilanes. After the reaction was completed, the ampoule was frozen, opened under vacuum and products formed were isolated by combined condensation/distillation procedures. Products were analyzed and characterized by standard procedures, especially by NMR spectroscopy and GC/MS analyses.

Identification of products Products were analyzed by $^1$H, $^{29}$Si and $^1$H-$^{29}$Si—HSQC NMR spectroscopy. The spectra were recorded on a Bruker AV-500 spectrometer equipped with a Prodigy BBO 500 S1 probe. $^1$H-NMR spectra were calibrated to the residual solvent proton resonance ([D$_6$] benzene $\delta_H$=7.16 ppm). Product identification was additionally supported by GC-MS analyses and verified identification of the main products. GC-MS analyses were measured with a Thermo Scientific Trace GC Ultra coupled with an ITQ 900MS mass spectrometer. The stationary phase (Macherey-Nagel PERMABOND Silane) had a length of 50 m with an inner diameter of 0.32 mm. 1 µl of analyte solution was injected, ¹/₂₅ thereof was transferred onto the column with a flow rate of 1.7 mL/min carried by helium gas. The temperature of the column was first kept at 50° C. for 10 minutes. Temperature was then elevated at a rate of 20° C./min up to 250° C. and held at that temperature for another 40 minutes. After exiting the column, substances were ionized with 70 eV and cationic fragments were measured within a range of 34-600 m/z (mass per charge). Product mixtures were diluted with benzene prior to the measurement.

The characteristic $^{29}$Si-NMR chemical shifts and coupling constants J{$^{29}$Si-$^1$H} for compounds I to XV are listed in Table 1.

TABLE 1

| compound no. | Silane | $\delta^{29}$Si NMR shift (ppm) A | B | $^1J_{Si-H}$ (Hz) A | B |
|---|---|---|---|---|---|
| I | Me$_2$SiH$_2$ | −38.3 | | 187.1 | |
| II | Me$_2$SiCl$_2$ | 32.6 | | — | |
| III | Me$_2$SiHCl | 11.3 | | 222.9 | |
| IV | MeSiCl$_3$ | 12.8 | | — | |
| V | MeSiH$_2$Cl | −12.0 | | 231.6 | |
| VI | MeSiHCl$_2$ | 11.1 | | 282.7 | |
| VII | MeSiH$_3$ | −64.8 | | −193.9 | |
| VIII | (Me$_2$ClSi)$_2$ | 17.4 | | — | |
| IX | (Me$_2$HSi)$_2$ | −39.6 | | 177.8 | |
| X | Me$_2$ClSi$^A$—Si$^B$HMe$_2$ | 23.0 | −39.1 | — | 181.1 |
| XI | (MeCl$_2$Si)2 | 17.5 | | — | |
| XII | (Cl$_2$MeSi)$_2$—CH$_2$ | 26.2 | | — | |
| XIII | ClMe$_2$Si$^A$—CH$_2$—Si$^B$MeCl$_2$ | 28.1 | 25.7 | — | |
| XIV | (Me$_2$ClSi)$_2$—CH$_2$ | 28.3 | | — | |
| XV | Me$_3$Si$^A$—CH$_2$—Si$^B$Me$_2$Cl | −0.4 | 30.0 | — | |

Example 1

LiH (3.0 mmol), Me$_2$SiCl$_2$ (1.7 mmol), tetraglyme (0.35 ml) and catalytic amounts of n-Bu$_4$PCl (0.02 mmol) were placed in an NMR tube cooled to −196° C. (liquid nitrogen). After evacuation the NMR tube was sealed and warmed to room temperature (r.t.). The starting materials reacted upon heating the sample, and the reaction course of the chlorosilane reduction/redistribution reaction was monitored by NMR spectroscopy.

TABLE 2

| no. | silane | 80° C., 0.25 h | 120° C., +2 h | 120° C., +2.5 h | 120° C., +6 h |
|---|---|---|---|---|---|
| I | Me$_2$SiH$_2$ | 31 | 35 | 47 | 55 |
| II | Me$_2$SiCl$_2$ | 57 | 20 | 7 | 3 |
| III | Me$_2$SiHCl | 12 | 45 | 46 | 42 |

As can be seen from Table 2, the formation of hydridosilane $Me_2SiH_2$ I was steadily increasing with increasing reaction temperature and time. The maximum amount of chlorosilane $Me_2SiHCl$ III formed by redistribution of hydridosilane I with dichlorosilane II was about 46 mol %. At 120° C./10 h the molar amount of $Me_2SiCl_2$ was reduced to only 3%, thus being hardly available for further redistribution with $Me_2SiH_2$, present in an amount of 55 mol-% under these reaction conditions.

Example 2

The reaction was performed in an analogous manner to the reaction of Example 1 using diglyme as solvent.

Table 3 covers the experimental findings of running the reaction as described. The yield of the target compound III was 55% at 120° C./2 h.

TABLE 3

| no. | silane | 80° C., 0.25 h | 120° C., +2 h | 120° C., +2.5 h | 120° C., +6 h |
|---|---|---|---|---|---|
| I | $Me_2SiH_2$ | 37 | 24 | 36 | 45 |
| II | $Me_2SiCl_2$ | 51 | 21 | 13 | 5 |
| III | $Me_2SiHCl$ | 12 | 55 | 51 | 50 |

Example 3

The reaction was performed in full analogy to the reactions of the Examples 1 and 2 using 1,4-dioxane as solvent. Table 4 covers the experimental findings of running the reaction as described. In comparison to the reactions in tetraglyme (Example 1) and diglyme (Example 2), the redistribution in 1,4-dioxane required longer reaction times, but finally gave comparable results.

TABLE 4

| no. | silane | 120° C., +2 h | 120° C., +2.5 h | 120° C., +6 h | 120° C., +21 h | 120° C., +24 h | 120° C., +60 h |
|---|---|---|---|---|---|---|---|
| I | $Me_2SiH_2$ | 47 | 41 | 38 | 34 | 34 | 35 |
| II | $Me_2SiCl_2$ | 42 | 35 | 24 | 14 | 10 | 8 |
| III | $Me_2SiHCl$ | 11 | 24 | 38 | 52 | 56 | 57 |

Example 4

The reaction was performed in analogy to the reaction of Example 1 using tetraglyme as solvent, but with a shortage of LiH (1.4 mmol) and at a higher reaction temperature (160° C.).

Table 5 covers the experimental findings of running the reaction as described. Even at 160° C. for 86 h, the catalyst remained unreacted as observed.

TABLE 5

| no. | silane | 160° C., 26 h | 160° C., +60 h |
|---|---|---|---|
| I | $Me_2SiH_2$ | 6 | 7 |
| II | $Me_2SiCl_2$ | 50 | 39 |
| III | $Me_2SiHCl$ | 44 | 54 |

Example 5

In analogy to the reaction of Example 1, $MeSiCl_3$ (1.7 mmol), tetraglyme (0.35 ml) and catalytic amounts of n-$Bu_4PCl$ (0.02 mmol) were placed in an NMR tube, cooled to −196° C. (liquid nitrogen), then LiH (2.5 mmol) was added; the NMR tube was evacuated, sealed and warmed to r.t. The starting materials reacted upon heating the sample, and the course of the chlorosilane reduction/redistribution reaction was monitored by NMR spectroscopy.

TABLE 6

| no. | silane | 80° C., 0.25 h | 120° C., +2 h | 120° C., +2.5 h | 120° C., +6 h | 120° C., +60 h |
|---|---|---|---|---|---|---|
| IV | $MeSiCl_3$ | 55 | 33 | 12 | 8 | 3 |
| V | $MeSiH_2Cl$ | — | — | 14 | 23 | 32 |
| VI | $MeSiHCl_2$ | 45 | 67 | 74 | 67 | 60 |
| VII | $MeSiH_3$ | — | — | — | 2 | 5 |

As listed in Table 6, the molar amount of methyltrichlorosilane IV was steadily decreasing with increasing reaction temperatures and reaction times, and the molar amount of the target compound $MeSiHCl_2$ IV increased to 74%, while $MeSiH_2Cl$ was formed in an amount of 14% yield at 120° C. (4.5 h). With prolonged reaction times, chlorosilane IV was reduced almost quantitatively. With prolonged reaction times at 120° C., the amount of VI decreased (60%) due to LiH excess, that supported formation of hydridochlorosilanes V (32%) and hydridosilane VII (5%).

Example 6

The reaction was performed in analogy to the reaction of Example 5, but using diglyme as solvent and 2.7 mmol LiH. Table 7 covers the results of running the reaction as described, showing comparable trends and giving similar results as obtained in Example 5. Notably, already with shorter reaction time, overall hydrogenation is about 90% after ca. 2 hours at 120° C. The equilibrium between silanes V/VI was shifted with prolonged reaction times, implying targeted product formation by simply controlling the reaction conditions.

TABLE 7

| no. | silane | 80° C./ 0.25 h + 120° C./2 h | 120° C., +2.5 h | 120° C., +6 h | 120° C., +60 h |
|---|---|---|---|---|---|
| IV | MeSiCl$_3$ | 9 | 5 | 3 | 2 |
| V | MeSiH$_2$Cl | 23 | 28 | 37 | 41 |
| VI | MeSiHCl$_2$ | 66 | 63 | 53 | 48 |
| VII | MeSiH$_3$ | 2 | 3 | 7 | 9 |

Example 7

The reaction was performed in analogy to the reaction of Example 6, but using only half the amount of n-Bu$_4$PCl (0.01 mmol) and 3.0 mmol LiH.

Table 8 covers the experimental findings of running the reaction of Example 7, giving comparable results obtained in Example 6 and this for a lower amount of catalyst. Again, production of specific target compounds can be controlled by the reaction conditions.

TABLE 8

| no. | silane | 80° C., 0.25 h | 120° C., +2 h | 120° C., +2.5 h | 120° C., +6 h | 120° C., +60 h |
|---|---|---|---|---|---|---|
| IV | MeSiCl$_3$ | 36 | 7 | 3 | 3 | 1 |
| V | MeSiH$_2$Cl | 15 | 29 | 35 | 41 | 44 |
| VI | MeSiHCl$_2$ | 48 | 59 | 55 | 46 | 40 |
| VII | MeSiH$_3$ | 1 | 5 | 7 | 10 | 15 |

Example 8

The reaction was performed in analogy to Example 5 in tetraglyme as solvent, but with a shortage of LiH (1.1 mmol) and at a higher reaction temperature. In Table 9 the results of running the reaction as described are listed. This example clearly shows that MeSiHCl$_2$ VI is formed selectively in case chlorosilane IV is used in large excess. Related to the molar amount of MeSiH$_3$ that had been formed first, product formation was quantitative. Here LiH hydrogenates MeSiCl$_3$ completely to give MeSiH$_3$. Then, MeSiH$_3$ redistributes with MeSiCl$_3$. Again, the catalyst n-Bu$_4$PCl remained unreacted (as observed by $^{31}$P NMR).

TABLE 9

| no. | silane | 160° C., 26 h |
|---|---|---|
| IV | MeSiCl$_3$ | 43 |
| V | MeSiH$_2$Cl | — |
| VI | MeSiHCl$_2$ | 57 |
| VII | MeSiH$_3$ | — |

Example 9

In this experiment, both target compounds III and VI were synthesized by mixing the two methylchlorosilanes II (0.9 mmol) and IV (0.9 mmol) with lithium hydride (2.5 mmol) in tetraglyme (0.35 ml) under phosphonium chloride (0.02 mmol) catalysis. $^{29}$Si-NMR spectroscopic reaction control showed that dimethylsilane I was not formed, even with increasing reaction temperatures/times. In contrast, methylsilane VII started to form at 120° C. with increasing molar amounts with prolonging the reaction times. While chlorosilane IV was completely consumed at 120° C. (26 h), Me$_2$SiCl$_2$ reacted more slowly, after 86 h (120° C.) the molar amount in the mixture was still 30%. As demonstrated earlier, product formation was simply controlled by the reaction conditions: methyldichlorosilane formation is favoured at a short reaction time (32%, 120° C./2 h), while the molar amount of dimethylchlorosilane III constantly increased with longer reaction times. The results are displayed in Table 10.

TABLE 10

| no. | silane | educt (%) | 80° C., 0.25 h | 120° C., +2 h | 120° C., +24 h | 120° C., +60 h |
|---|---|---|---|---|---|---|
| I | Me$_2$SiH$_2$ | — | — | — | — | — |
| II | Me$_2$SiCl$_2$ | 50 | 46 | 42 | 34 | 30 |
| III | Me$_2$SiHCl | — | 6 | 9 | 15 | 19 |
| IV | MeSiCl$_3$ | 50 | 19 | 4 | — | — |
| V | MeSiH$_2$Cl | — | 5 | 12 | 22 | 23 |
| VI | MeSiHCl$_2$ | — | 22 | 32 | 22 | 17 |
| VII | MeSiH$_3$ | — | — | 1 | 7 | 11 |

Example 10

In an ampoule equipped with a magnetic stirrer were placed 0.81 g (101.89 mmol) LiH and 0.11 g (0.37 mmol) n-Bu$_4$PCl, suspended in 8 ml of thoroughly dried diglyme under inert nitrogen atmosphere. The ampoule was degassed in vacuo and cooled to −196° C. Then 15.23 g (101.89 mmol) of MeSiCl$_3$ were slowly added via a syringe. After addition of the starting materials was completed, the ampoule was sealed, warmed to r.t. and stirred at 80° C. for 72 h. Subsequently the ampoule was opened and the volatiles were condensed off to give the product mixture listed in Table 11. Product yields were nearly quantitative related to the intermediately formed methylsilane VII (80% conversion of VII into V and VI). The supposed amount of intermediately formed methylsilane VII is based on the assumption that chlorosilanes are fully hydrogenated by the present amount of LiH, and no partial hydrogenation occurs instead.

TABLE 11

| no. | silane | mol-% | mmol | g |
|---|---|---|---|---|
| IV | MeSiCl$_3$ | 55.2 | 56.24 | 8.41 |
| V | MeSiH$_2$Cl | 1.8 | 1.83 | 0.15 |
| VI | MeSiHCl$_2$ | 39.4 | 40.14 | 4.62 |
| VII | MeSiH$_3$ | 3.6 | 3.67 | 0.17 |

Example 11

In an ampoule equipped with a magnetic stirrer were placed 0.55 g (69.18 mmol) LiH and 0.12 g (0.41 mmol) n-Bu$_4$PCl, suspended in 8 ml of thoroughly dried diglyme under inert nitrogen atmosphere. The ampoule was degassed in vacuo and cooled to −196° C. Then 8.93 g (69.19 mmol) of Me$_2$SiCl$_2$ were slowly added. The ampoule was sealed, warmed to r.t. and stirred at 80° C. for 72 h. Subsequently the ampoule was opened and the volatiles were condensed off to give the target compound III in 51.1% yield (73% conversion of the intermediately formed dimethylsilane I into III) (see Table 12). This calculation is based on the assumption that excess chlorosilanes are fully hydrogenated by the present amount of LiH, and no partial hydrogenation occurs instead.

TABLE 12

| no. | silane | mol-% | mmol | g |
|---|---|---|---|---|
| I | Me$_2$SiH$_2$ | 9.4 | 6.22 | 0.37 |
| II | Me$_2$SiCl$_2$ | 39.5 | 26.13 | 3.37 |
| III | Me$_2$SiHCl | 51.1 | 33.81 | 3.20 |

Example 12

LiH (1.5 mmol), Me$_2$SiCl$_2$ (1.6 mmol), diglyme (0.4 ml) and a catalytic amount of n-Bu$_4$NCl (0.02 mmol) were placed in an NMR tube that was cooled to −196° C. (liquid nitrogen). After evacuation in vacuo the NMR tube was sealed and warmed to r.t. The starting materials reacted upon heating the sample, and the reaction course of the chlorosilane reduction/redistribution reaction was monitored by NMR spectroscopy.

TABLE 13

| no. | silane | 120° C., 22 h | 160° C., +40 h |
|---|---|---|---|
| I | Me$_2$SiH$_2$ | 7 | 10 |
| II | Me$_2$SiCl$_2$ | 42 | 41 |
| III | Me$_2$SiHCl | 52 | 49 |

After 22 h at 120° C., dimethyldichlorosilane was hydrogenated to give dimethylsilane I that subsequently redistributed with dimethyldichlorosilane to give Me$_2$SiHCl III in a molar amount of 52%. Increasing the reaction temperature and time led to further hydrogenation of chlorosilanes but did not change the product distribution significantly (Table 13).

Example 13

The reaction was performed in an analogous manner to the reaction of Example 12 using PPh$_3$ (0.02 mmol) as redistribution catalyst.

TABLE 14

| no. | silane | 120° C., 13 h | 160° C., +22 h | 160° C., +40 h |
|---|---|---|---|---|
| I | Me$_2$SiH$_2$ | 32 | 14 | 11 |
| II | Me$_2$SiCl$_2$ | 66 | 47 | 33 |
| III | Me$_2$SiHCl | 2 | 39 | 56 |

As can be seen from Table 14, the formation of Me$_2$SiHCl I was steadily increasing with increasing reaction temperature and time. The maximum amount of chlorosilane III formed by redistribution of hydridosilane (I) with dichlorosilane II was 56% after 62 h at 160° C.

Example 14

The reaction was performed in analogy to the reaction of Example 12 using n-Bu$_3$P (0.02 mmol) as redistribution catalyst.

TABLE 15

| no. | silane | 120° C., 13 h | 160° C., +22 h | 160° C., +40 h |
|---|---|---|---|---|
| I | Me$_2$SiH$_2$ | 34 | 25 | 16 |
| II | Me$_2$SiCl$_2$ | 64 | 48 | 30 |
| III | Me$_2$SiHCl | 2 | 27 | 54 |

Similar to Example 13, the maximum molar amount of chlorosilane III formed by redistribution was 54% after additional 62 h at 160° C. (Table 15).

Example 15

The reaction was performed in an analogous manner to the reaction of Example 12 using 2-methylimidazole (0.02 mmol) as redistribution catalyst.

TABLE 16

| no. | silane | 120° C., 13 h | 160° C., +22 h | 200° C., +40 h |
|---|---|---|---|---|
| I | Me$_2$SiH$_2$ | 34 | 39 | 21 |
| II | Me$_2$SiCl$_2$ | 65 | 57 | 24 |
| III | Me$_2$SiHCl | 1 | 4 | 52 |
|  | not ident. | — | — | 3 |

In contrast to Example 13 and 14, Me$_2$SiHCl III was formed only in a molar amount of 4% after 22 h/160° C. Increasing the reaction temperature and reaction time to 200° C./40 h finally gave the compound III in a molar amount of 52% (Table 16).

Example 16

The reaction was performed in analogy to the reaction of Example 12 using n-Bu$_3$N (0.02 mmol) as redistribution catalyst.

TABLE 17

| no. | silane | 120° C., 13 h | 160° C., +22 h | 200° C., +40 h |
|---|---|---|---|---|
| I | Me$_2$SiH$_2$ | 31 | 38 | 45 |
| II | Me$_2$SiCl$_2$ | 68 | 60 | 50 |
| III | Me$_2$SiHCl | 1 | 2 | 5 |

As listed in Table 17, chlorosilane II was formed in a molar amount of 2% at 160° C./22 h. With prolonged reaction times at 200° C., the amount of III increased only slightly (5%).

Example 17

The reaction was performed in an analogous manner to the reaction of Example 12 using NPh$_3$ (0.02 mmol) as redistribution catalyst.

TABLE 18

| no. | silane | 120° C., 13 h | 160° C., +22 h | 200° C., +40 h |
|---|---|---|---|---|
| I | Me$_2$SiH$_2$ | 27 | 31 | 37 |
| II | Me$_2$SiCl$_2$ | 72 | 67 | 60 |
| III | Me$_2$SiHCl | 1 | 2 | 3 |

Similar to Example 16, chlorosilane II was formed only in a molar amount of 2% at 160° C./22 h. With prolonged reaction times at 200° C., the amount of III increased insignificantly (3%). The results are displayed in Table 18.

Example 18

In analogy to Example 12, MeSiCl$_3$ (1.7 mmol) was reacted with LiH (1.5 mmol) in diglyme (0.4 ml) as solvent and in the presence of a catalytic amount of n-Bu$_4$NCl (0.02 mmol).

TABLE 19

| no. | silane | 120° C., 22 h | 160° C., +40 h |
|---|---|---|---|
| IV | MeSiCl$_3$ | 21 | 16 |
| V | MeSiH$_2$Cl | 11 | 19 |
| VI | MeSiHCl$_2$ | 68 | 63 |
| VII | MeSiH$_3$ | — | 2 |

After 22 h at 120° C. MeSiCl$_3$ IV was hydrogenated to give MeSiH$_3$ VII that subsequently redistributed with chlorosilane IV to give MeSiHCl$_2$ VI and MeSiH$_2$Cl V in a molar amount of 68% and 11%, respectively. With prolonged reaction times at 160° C., the molar amount of MeSiHCl$_2$ VI decreased due to further hydrogenation by remaining LiH but increased the molar amount of MeSiH$_2$Cl V to 19% (Table 19).

Example 19

The reaction was performed in an analogous manner to the reaction of Example 18 using PPh$_3$ (0.02 mmol) as redistribution catalyst.

TABLE 20

| no. | silane | 120° C., 13 h | 160° C., +22 h | 160° C., +40 h |
|---|---|---|---|---|
| IV | MeSiCl$_3$ | 60 | 22 | 12 |
| V | MeSiH$_2$Cl | 5 | 15 | 23 |
| VI | MeSiHCl$_2$ | 3 | 62 | 62 |
| VII | MeSiH$_3$ | 32 | 1 | 3 |

After 13 h at 120° C. MeSiCl$_3$ IV was reduced to give silane VII in a molar amount of 32% as well as V and VI in molar amounts of 5% and 3% by redistribution reactions. Increasing the reaction temperature to 160° C. (22 h) gave 62% of MeSiHCl$_2$ VI and 15% of MeSiH$_2$Cl (V), while silane VII reached the level of 1%. With prolonged reaction times, the molar amount of chlorosilane IV was further reduced to give 23% of MeSiH$_2$Cl V. The targeted product VI reached a level of 62% (Table 20).

Example 20

The reaction was performed in analogy to the reaction of Example 18 using n-Bu$_3$P (0.02 mmol) as redistribution catalyst.

TABLE 21

| no. | silane | 120° C., 13 h | 160° C., +22 h | 160° C., +40 h |
|---|---|---|---|---|
| IV | MeSiCl$_3$ | 49 | 27 | 19 |
| V | MeSiH$_2$Cl | 13 | 10 | 15 |
| VI | MeSiHCl$_2$ | 34 | 63 | 66 |
| VII | MeSiH$_3$ | 4 | traces | traces |

As listed in Table 21, at 120° C./13 h the targeted products VI and V were formed in molar amounts of 34% and 13%, respectively. The maximum molar amounts of chlorosilanes VI and V formed by redistribution of hydridosilane VII with methyltrichlorosilane IV were respectively 66% and 15% after additional 62 h at 160° C.

Example 21

The reaction was performed in an analogous manner to the reaction of Example 18 using 2-methylimidazole (0.02 mmol) as redistribution catalyst.

TABLE 22

| no. | silane | 120° C., 13 h | 160° C., +22 h | 160° C., +40 h |
|---|---|---|---|---|
| IV | MeSiCl$_3$ | 55 | 49 | 44 |
| V | MeSiH$_2$Cl | 8 | — | — |
| VI | MeSiHCl$_2$ | 37 | 46 | 51 |
| | not ident. | — | 5 | 5 |

As listed in Table 22, the amount of targeted product VI increased from 37% at 120° C./13 h to 46% at 160° C./+22 h, while not identified products were formed in a molar amount of 5%. With prolonged reaction times, at 160° C. the amount of MeSiHCl$_2$ increased to 51%, while that of side products remained constant (5%).

Example 22

The reaction was performed analogously to the reaction of Example 18 using n-Bu$_3$N (0.02 mmol) as redistribution catalyst.

TABLE 23

| no. | silane | 120° C., 13 h | 160° C., +22 h | 160° C., +40 h |
|---|---|---|---|---|
| IV | MeSiCl$_3$ | 70 | 53 | 41 |
| V | MeSiH$_2$Cl | 3 | 14 | 22 |
| VI | MeSiHCl$_2$ | 2 | 10 | 28 |
| VII | MeSiH$_3$ | 25 | 23 | 9 |

After 13 h at 120° C. MeSiCl$_3$ IV was reduced to give silane 25% of VII as well as V and VI in molar amounts of 2% and 3%, respectively by redistribution reactions. Increasing the reaction temperature to 160° C. (22 h) gave 10% of MeSiHCl$_2$ VI and 14% of MeSiH$_2$Cl V, while silane VII reached a level of 23%. With prolonged reaction times, the amount of chlorosilane IV was further reduced to give the targeted products VI and V in molar amounts of 28% and 22%, respectively. MeSiH$_3$ VII reached the level of 9% (Table 23).

Example 23

The reaction was performed analogously to the reaction of Example 18 using NPh$_3$ (0.02 mmol) as redistribution catalyst.

TABLE 24

| no. | silane | 120° C., 13 h | 160° C., +22 h | 160° C., +40 h |
|---|---|---|---|---|
| IV | MeSiCl$_3$ | 74 | 55 | 37 |
| V | MeSiH$_2$Cl | 5 | 16 | 8 |
| VI | MeSiHCl$_2$ | 2 | 18 | 55 |
| VII | MeSiH$_3$ | 19 | 11 | — |

As listed in Table 24, methylsilane VII was formed in molar amount of 19% as well as V and VI in molar amounts of 2% and 5%, respectively, via redistribution of VII with IV. The maximum amount of MeSiHCl$_2$ VI was 55% at 160° C./62 h, while MeSiH$_3$ VII was completely consumed; methylchlorosilane V reached a level of 8%.

Example 24

LiH (3.7 mmol), MeSiCl$_3$ (0.9 mmol), MeCl$_2$Si—SiCl$_2$Me (0.9 mmol), diglyme (0.4 ml) and catalytic amounts of n-Bu$_4$PCl (0.04 mmol) were placed in an NMR tube cooled to −196° C. (liquid nitrogen). After evacuation the NMR tube was sealed, warmed and the reaction course was investigated NMR spectroscopically.

TABLE 25

| no. | silane | 120° C., 13 h | 160° C., +22 h |
|---|---|---|---|
| IV | MeSiCl$_3$ | 26 | 9 |
| V | MeSiH$_2$Cl | 10 | 24 |
| VI | MeSiHCl$_2$ | 64 | 64 |
| VII | MeSiH$_3$ | — | 3 |

Already at 120° C./13 h MeCl$_2$Si—SiCl$_2$Me XI was hydrogenated, quantitatively cleaved and redistributed with monosilanes to give the targeted products VI and V in molar amounts of 64% and 10%, respectively. Prolonged reaction times at 160° C. increased the amount of V (24%), while MeSiH$_3$ was formed in a molar amount of 3% (Table 25).

Example 25

The reaction was performed in an analogous manner to the reaction of Example 24 using Me$_2$SiCl$_2$ (0.8 mmol), Me$_2$ClSi—SiClMe$_2$ (0.8 mmol), LiH (2.5 mmol), diglyme (0.4 ml) and catalytic amounts of n-Bu$_4$PCl (0.04 mmol).

TABLE 26

| no. | silane | 120° C., 13 h | 120° C., +22 h |
|---|---|---|---|
| I | Me$_2$SiH$_2$ | 17 | 35 |
| II | Me$_2$SiCl$_2$ | 9 | 6 |
| III | Me$_2$SiHCl | 44 | 42 |
| VIII | (Me$_2$ClSi)$_2$ | 9 | 1 |
| IX | (Me$_2$HSi)$_2$ | 4 | 6 |
| X | Me$_2$ClSi—SiHMe$_2$ | 17 | 5 |
|  | trisilanes | — | 5 |

At 120° C./13 h, Me$_2$ClSi—SiClMe$_2$ was cleaved as well as partially and fully hydrogenated to give 4% of compound IX and 17% of compound X. Targeted product Me$_2$SiHCl III was formed in a molar amount of 44% besides 17% of Me$_2$SiH$_2$. Prolonged reaction times (22 h) led to further hydrogenation by LiH to give 35% of compound I, while targeted product III was reduced to 42%. The amount of disilanes VIII and X decreased to 1% and 5%, respectively, while the amount of the fully hydrogenated disilane IX increased slightly (6%). Trisilanes were formed in a molar amount of 5% (Table 26).

Example 26

The reaction was performed in an analogous manner to the reaction of Example 24 using MeCl$_2$Si—SiCl$_2$Me (0.6 mmol), MeSiCl$_3$ (0.6 mmol), LiH (1.5 mmol), diglyme (0.4 ml) and PPh$_3$ (0.05 mmol) as redistribution catalyst.

TABLE 27

| no. | silane | 160° C., 16 h | 220° C., +15 h |
|---|---|---|---|
| IV | MeSiCl$_3$ | 42 | 29 |
| V | MeSiH$_2$Cl | 8 | 11 |
| VI | MeSiHCl$_2$ | 50 | 56 |
|  | not ident. | — | 4 |

After 16 h at 160° C., the starting disilane MeCl$_2$Si—SiCl$_2$Me XI was quantitatively cleaved and via redistribution reactions the targeted products MeSiHCl$_2$ VI and MeSiH$_2$Cl V were formed in molar amounts of 50% and 8%, respectively. With prolonged reaction times (15 h) at 220° C., the molar amounts of VI and V were further increased to 56% and 11%, while non-identified products were formed in a molar amount of 4% (Table 27).

Example 27

0.6 mmol of a complex mixture of chlorocarbodisilanes (carbodisilane distribution is listed in Table 28), Me$_2$SiCl$_2$ (0.8 mmol), LiH (1.6 mmol), n-Bu$_3$P (0.05 mmol) and diglyme (0.3 ml) were placed in a cooled NMR tube (−196° C.). After evacuation in vacuo the NMR tube was sealed and warmed to r.t. The starting materials reacted upon heating the sample, and the reaction course of the chlorosilane reduction/redistribution reaction was monitored by NMR spectroscopy.

TABLE 28

| no. | silane | educt (%) |
|---|---|---|
| XII | (Cl$_2$MeSi)$_2$—CH$_2$ | 45 |
| XIII | ClMe$_2$Si—CH$_2$—SiMeCl$_2$ | 31 |
| XIV | (Me$_2$ClSi)$_2$—CH$_2$ | 14 |
| XV | Me$_3$Si—CH$_2$—SiMe$_2$Cl | 10 |

TABLE 29

| no. | silane | 160° C., 16 h | 220° C., +15 h |
|---|---|---|---|
| I | Me$_2$SiH$_2$ | 34 | 5 |
| II | Me$_2$SiCl$_2$ | 36 | 25 |
| III | Me$_2$SiHCl | 8 | 34 |
| V | MeSiH$_2$Cl | — | 7 |
| VI | MeSiHCl$_2$ | — | 7 |
| VII | MeSiH$_3$ | 2 | 9 |
|  | carbodisilanes | 20 | 13 |

After 16 h at 160° C., the targeted product Me$_2$SiHCl III as well as dimethylsilane were formed in molar amounts of 8% and 34%, respectively. Hydrogenation and cleavage of chlorocarbodisilanes gave 2% of methylsilane VII. With prolonged reaction times (15 h) at 220° C. the molar amount of III increased to 34%, while that of Me$_2$SiH$_2$ I decreased (5%) due to redistribution reactions with chlorosilanes. Carbodisilanes were further cleaved (13% remained) to give silanes VI, V and VII in molar amounts of 7%, 7% and 9%, respectively (Table 29).

Comparative Example 1

The reaction was performed in analogy to the reaction of Examples 6 and 7, but under omission of n-Bu$_4$PCl as redistribution catalyst. As listed in Table 30, the target compounds MeSiHCl$_2$ (VI, 11%) and MeSiH$_2$Cl (V, 28%) were formed at 160° C., but required long reaction times.

TABLE 30

| no. | silane | 60° C., 2 min | 100° C., +19 h | 120° C., +40 h | 160° C., +40 h |
|---|---|---|---|---|---|
| IV | MeSiCl$_3$ | 75 | 60 | 54 | 36 |
| V | MeSiH$_2$Cl | 2 | 6 | 10 | 28 |
| VI | MeSiHCl$_2$ | 1 | 4 | 5 | 11 |
| VII | MeSiH$_3$ | 22 | 30 | 31 | 25 |

Comparative Example 2

In an ampoule were suspended 0.30 g (37.7 mmol) LiH in 5 ml of thoroughly dried diglyme under inert nitrogen atmosphere. The ampoule was degassed in vacuo and cooled to −196° C. Then 5.64 g (37.7 mmol) of MeSiCl$_3$ were slowly added. The ampoule was again degassed in vacuo and sealed. After 172 h at 160° C., the ampoule was opened and the volatiles were condensed off. MeSiHCl$_2$ was isolated in a molar amount of 61%, MeSiH$_2$Cl in a molar amount of 10% 27% of MeSiCl$_3$ remained unreacted (see Table 31). Related to MeSiH$_3$ that was formed in situ, 93% of compound VII have been converted into the target products V and VI. LiCl formed by chlorosilane reduction was acting as redistribution catalyst and remained as residue.

TABLE 31

| no. | silane | mol-% | mmol | g |
|---|---|---|---|---|
| IV | MeSiCl$_3$ | 27 | 10.1 | 1.51 |
| V | MeSiH$_2$Cl | 10 | 3.6 | 0.29 |
| VI | MeSiHCl$_2$ | 61 | 23.1 | 2.66 |
| VII | MeSiH$_3$ | 2 | 0.8 | 0.05 |

Comparative Example 3

Me$_2$SiCl$_2$ was reacted with LiH without any additional catalyst. 0.40 g LiH (50.3 mmol), 6.49 g (50.3 mmol) Me$_2$SiCl$_2$ and 5 ml diglyme were placed in an ampoule cooled to −196° C., which was evacuated and sealed. After 172 h at 160° C., the ampoule was opened and the volatiles were condensed off. Me$_2$SiHCl was isolated in a molar amount of 29%. 53% of Me$_2$SiCl$_2$ as well as 18% of Me$_2$SiH$_2$ remained unreacted (see Table 32). In relation to the amount of Me$_2$SiH$_2$ that was formed in situ, 43% have been converted into silane III. The supposed amount of Me$_2$SiH$_2$ formed in situ is based on the assumption that excess chlorosilanes are fully hydrogenated by the amount of LiH present in a reaction mixture, and no partial hydrogenation occurs instead.

TABLE 32

| no. | silane | mol-% | mmol | g |
|---|---|---|---|---|
| I | Me$_2$SiH$_2$ | 18 | 9.7 | 0.58 |
| II | Me$_2$SiCl$_2$ | 53 | 26.6 | 3.43 |
| III | Me$_2$SiHCl | 29 | 14.4 | 1.36 |

Comparative Example 4

Methylchlorosilanes MeSiCl$_3$ (IV, 1.7 mmol) and Me$_2$SiCl$_2$ (II, 1.6 mmol) were reacted (each separately) in analogy to the NMR tube experiments described before with lithium hydride (1.0 mmol) in tetraglyme (0.35 ml) in the presence of KCl (0.8 mmol), AlCl$_3$ (0.8 mmol) or γ-Al$_2$O$_3$ (0.8 mmol) at 160° C. accordingly to the target reactions:

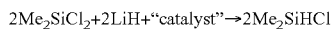

2Me$_2$SiCl$_2$+2LiH+"catalyst"→2Me$_2$SiHCl

3MeSiCl$_3$+3LiH+"catalyst"→3MeSiH$_2$Cl

The term "catalyst" refers to KCl, AlCl$_3$ and γ-Al$_2$O$_3$ applied as redistribution catalyst in the performed experiments. As can be seen from Table 33 redistribution product III was formed with KCl (15 mol %), AlCl$_3$ (10 mol %) and γ-Al$_2$O$_3$ (7 mol %) in comparably small amounts and under drastic conditions (160° C.). Notably, in all cases lithium chloride was present from chlorosilane reductions, itself acting as redistribution catalyst.

TABLE 33

| no. | silane | KCl 26 h | KCl +7 d | AlCl$_3$ 26 h | AlCl$_3$ +7 d | γ-Al$_2$O$_3$ 26 h | γ-Al$_2$O$_3$ +7 d |
|---|---|---|---|---|---|---|---|
| I | Me$_2$SiH$_2$ | 14 | 18 | 24 | 30 | 12 | 16 |
| II | Me$_2$SiCl$_2$ | 80 | 66 | 31 | — | 75 | 31 |
| III | Me$_2$SiHCl | 4 | 15 | 10 | — | 4 | 7 |
| — | not ident. | 2 | 1 | 35 | 70 | 9 | 46 |

The results of the reactions directed at the formation of monomethylsilanes V and VI from MeSiH$_3$ VII are displayed in Table 34. Under drastic conditions (160° C. and long reaction times until 7 days) the compound VI was formed from the mixtures KCl/LiCl (51 mol %).

AlCl$_3$/LiCl (23 mol %) and γ-Al$_2$O$_3$/LiCl (41 mol %). As it can be seen from Comparative Examples 2 and 3, lithium chloride solely acting as redistribution catalyst showed a comparable redistribution activity, suggesting to be the more efficient catalyst. Notably, from Tables 33 and 34 it is obvious that in both series of experiments the amount of products that could not be identified, was quite large.

TABLE 34

| no. | silane | KCl 26 h | KCl +7 d | AlCl$_3$ 26 h | AlCl$_3$ +7 d | γ-Al$_2$O$_3$ 26 h | γ-Al$_2$O$_3$ +7 d |
|---|---|---|---|---|---|---|---|
| IV | MeSiCl$_3$ | 74 | 39 | 41 | — | 66 | 27 |
| V | MeSiH$_2$Cl | 8 | 8 | 11 | 2 | 9 | 11 |
| VI | MeSiHCl$_2$ | 11 | 51 | 23 | — | 10 | 41 |
| VII | MeSiH$_3$ | 5 | — | 2 | 10 | 6 | 1 |
| — | not ident. | 2 | 2 | 23 | 88 | 9 | 20 |

Comparative Example 5

LiAlH$_4$ (0.18 mmol), n-Bu$_4$PCl (0.02 mmol) and diglyme (0.35 ml) were placed in an NMR tube and cooled to −196° C. (liquid nitrogen). Then Me$_2$SiCl$_2$ (0.7 mmol) was added and after evacuation the NMR tube was sealed, warmed and measured by NMR spectroscopy. As can be seen from Table 35, the target compound III was formed only in a molar amount of 4% under drastic conditions (140° C., +13 h).

TABLE 35

| no. | silane | educt (%) | 80° C., 13 h | 140° C., +13 h |
|---|---|---|---|---|
| I | Me$_2$SiH$_2$ | — | 33 | 27 |
| II | Me$_2$SiCl$_2$ | 100 | 65 | 66 |
| III | Me$_2$SiHCl | — | 2 | 4 |
| — | not ident. | — | — | 3 |

Comparative Example 6

The reaction was performed in analogy to Comparative Example 1, reacting Me$_2$SiCl$_2$ (0.9 mmol) with NaBH$_4$ (0.22 mmol), n-Bu$_4$PCl (0.02 mmol) and diglyme (0.35 ml) as solvent. Table 36 shows the formation of the compound III in a molar amount of 22%, decreasing at higher reaction temperatures and longer reaction times. Notably, the formation of Me$_2$SiH$_2$ was not detected by NMR spectroscopy.

TABLE 36

| no. | silane | educt (%) | 80° C., 13 h | 140° C., +13 h |
|---|---|---|---|---|
| I | Me$_2$SiH$_2$ | — | — | — |
| II | Me$_2$SiCl$_2$ | 100 | 78 | 74 |
| III | Me$_2$SiHCl | — | 22 | 11 |
| — | not ident. | — | — | 15 |

The invention claimed is:

1. A process for the manufacture of monosilanes of the general formula (I):

$$R_xSiH_yCl_z \quad (I),$$

wherein R is an organyl group,
x=1 to 3,
y=1 to 3,
z=0 to 3, and
x+y+z=4,
comprising:
A) the step of subjecting a silane substrate comprising one or more monosilanes of the general formula (II)

$$R_aSiH_bCl_c \quad (II)$$

wherein R is as defined above,
a=1 to 3,
b=0 to 3,
c=0 to 3, and
a+b+c=4,
with the proviso that at least one silane of the general formula (II) has at least one chlorine substituent at the silicon atom,
to the reaction with one or more metal hydrides selected from the group consisting of an alkali metal hydride and an alkaline earth metal hydride,
in the presence of one or more compounds (C) selected from the group consisting of:
R$^1_4$PCl, wherein R$^1$ is selected from the group consisting of hydrogen and an organyl group, which can be the same or different,
phosphines R$^1_3$P, wherein R$^1$ is selected from the group consisting of hydrogen and an organyl group and can be the same or different,
amines R$^1_3$N, wherein R$^1$ is selected from the group consisting of hydrogen and an organyl group and can be the same or different,
N-heterocyclic amines, and
ammonium compounds, and
B) optionally a step of separating the resulting monosilanes of the general formula (I) from the reaction mixture, and
wherein the monosilanes of the general formula (II) subjected to the reaction in step A) are formed by in situ cleavage of one or more compounds selected from the group consisting of
a) disilanes of the general empirical formula (III)

$$R_eSi_2H_fCl_g \quad (III)$$

wherein R is an organyl group,
e=1 to 5,
f=0 to 5,
g=0 to 5 and
e+f+g=6, and
b) carbodisilanes of the general empirical formula (IV)

$$R_m(SiCH_2Si)H_nCl_o \quad (IV)$$

wherein R is as defined above,
m=1 to 5,
n=0 to 5,
o=0 to 5 and
m+n+o=6.

2. The process according to claim 1, wherein step A) is carried out in one or more organic solvents.

3. The process of claim 1 wherein all silanes of the formula (II) in step A) have at least one chlorine substituent at the silicon atom.

4. The process of claim 1 wherein in general formula (I) and one or more of the silanes of the general formula (II), R is an alkyl or cycloalkyl group.

5. The process of claim 1 wherein the silane substrate comprises more than about 90 wt-% of one single (or specific) silane of the formula (II) having at least one chlorine substituent at the silicon atom based on the total weight of the silane substrate.

6. The process of claim 1 wherein the silane substrate comprises more than about 90 wt-% of one single (or specific) silane of the formula (II) having no hydrogen substituent at the silicon atom based on the total amount of the silane substrate.

7. The process of claim 1 wherein the step A) is conducted at a temperature of about 0° C. to about 300° C.

8. The process of claim 1 wherein the methyl monosilanes of the formula (I) are selected from the group consisting of $Me_2SiHCl$, $MeSiHCl_2$ and $MeSiH_2Cl$.

9. The process of claim 1, wherein the silanes of the general formula (II) are selected from the group consisting of $Me_2SiCl_2$ and $MeSiCl_3$.

10. The process of claim 1 wherein step A) is carried out in the presence of at least one compound (C) of the formula $R^1_4PCl$ wherein $R^1$ is as defined above.

11. The process of claim 1 wherein step A) is carried out in the presence of at least one compound of the formula $R^1_4PCl$ and the metal hydride is lithium hydride.

12. The process of claim 1 wherein in step A) $Me_2SiHCl$ is produced by the reaction of $Me_2SiCl_2$ with lithium hydride in the presence of at least one compound of the formula $R^1_4PCl$, in an ether compound having a boiling point at 1.01325 bar of at least 70° C.

13. The process of claim 1 wherein in step A) $MeSiHCl_2$ is produced by the reaction of $MeSiCl_3$ with lithium hydride in the presence of at least one compound of the formula $R^1_4PCl$, in an ether compound having a boiling point at 1.01325 bar of at least 70° C.

14. The process of claim 1 wherein the step of separating the resulting monosilanes of the formula (I) is carried out by distillation and/or condensation.

15. The process of claim 2, wherein the organic solvents are selected from the group consisting of 1,4-dioxane, diglyme, tetraglyme and mixtures thereof.

16. The process of claim 1 wherein the in situ cleavage is carried out in the presence of at least one compound (c) of the formula $R^1_4PCl$.

17. The process of claim 11 wherein step A) is carried out in the presence of n-$Bu_4PCl$.

18. The process of claim 12 wherein in step A) $Me_2SiHCl$ is produced by the reaction of $Me_2SiCl_2$ with lithium hydride in the presence of n-$Bu_4PCl$ in diglyme as solvent.

19. The process of claim 13 wherein in step A) $MeSiHCl_2$ is produced by the reaction of $MeSiCl_3$ with lithium hydride in the presence of n-$Bu_4PCl$ in diglyme as solvent.

20. A process for the manufacture of monosilanes of the general formula (I):

$$R_xSiH_yCl_z \qquad (I),$$

wherein R is an organyl group,
x=1 to 3,
y=1 to 3,
z=0 to 3, and
x+y+z=4,
comprising:
A) the step of subjecting a silane substrate comprising one or more monosilanes of the general formula (II)

$$R_aSiH_bCl_c \qquad (II)$$

wherein R is as defined above,
a=1 to 3,
b=0 to 3,
c=0 to 3, and
a+b+c=4,
with the proviso that at least one silane of the general formula (II) has at least one chlorine substituent at the silicon atom,
to the reaction with one or more metal hydrides selected from the group consisting of an alkali metal hydride and an alkaline earth metal hydride,
in the presence of one or more compounds (C) selected from the group consisting of:
$R^1_4PCl$, wherein $R^1$ is selected from the group consisting of hydrogen and an organyl group, which can be the same or different, and
phosphines $R^1_3P$, wherein $R^1$ is selected from the group consisting of hydrogen, unsubstituted alkyl, cycloalkyl, alkenyl and aryl, which can be the same or different, and
(B) optionally a step of separating the resulting monosilanes of the general formula (I) from the reaction mixture.

21. A process for the manufacture of monosilanes of the general formula (I):

$$R_xSiH_yCl_z \qquad (I),$$

wherein R is an organyl group,
x=1 to 3,
y=1 to 3,
z=0 to 3, and
x+y+z=4,
comprising:
A) the step of subjecting a silane substrate comprising one or more monosilanes of the general formula (II)

$$R_aSiH_bCl_c \qquad (II)$$

wherein R is as defined above,
a=1 to 3,
b=0 to 3,
c=0 to 3, and
a+b+c=4,
with the proviso that at least one silane of the general formula (II) has at least one chlorine substituent at the silicon atom,
to the reaction with one or more metal hydrides selected from the group consisting of an alkali metal hydride and an alkaline earth metal hydride,
in the presence of one or more compounds (C) selected from the group consisting of:
$R^1_4PCl$, wherein $R^1$ is selected from the group consisting of hydrogen and an organyl group, which can be the same or different,
phosphines $R^1_3P$, wherein $R^1$ is selected from the group consisting of hydrogen and an organyl group and can be the same or different,
amines $R^1_3N$, wherein $R^1$ is selected from the group consisting of hydrogen and an organyl group and can be the same or different,
N-heterocyclic amines, and
ammonium compounds and wherein step (A) is conducted in the presence of an ether compound having a boiling point at 1.01325 bar of at least 70° C., and (B) optionally a step of separating the resulting monosilanes of the general formula (I) from the reaction mixture.

* * * * *